US009730265B2

(12) United States Patent
Ahn et al.

(10) Patent No.: US 9,730,265 B2
(45) Date of Patent: *Aug. 8, 2017

(54) APPARATUS AND METHOD FOR CONTROLLING IN-DEVICE COEXISTENCE INTERFERENCE IN WIRELESS COMMUNICATION SYSTEM

(71) Applicant: GOLDPEAK INNOVATIONS INC, Seoul (KR)

(72) Inventors: Jae Hyun Ahn, Seoul (KR); Ki Bum Kwon, Seoul (KR); Myung Cheul Jung, Seoul (KR)

(73) Assignee: GOLDPEAK INNOVATIONS INC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,158

(22) Filed: Jun. 15, 2016

(65) Prior Publication Data

US 2016/0295602 A1    Oct. 6, 2016

Related U.S. Application Data

(63) Continuation of application No. 14/560,838, filed on Dec. 4, 2014, now Pat. No. 9,374,213, which is a (Continued)

(30) Foreign Application Priority Data

Oct. 14, 2011 (KR) .................. 10-2011-0105483
Oct. 27, 2011 (KR) .................. 10-2011-0110798

(51) Int. Cl.
 *H04W 76/04* (2009.01)
 *H04B 7/26* (2006.01)
(Continued)

(52) U.S. Cl.
 CPC ............ *H04W 76/048* (2013.01); *H04B 7/26* (2013.01); *H04B 15/00* (2013.01); *H04L 5/0078* (2013.01);
(Continued)

(58) Field of Classification Search
 None
 See application file for complete search history.

(56) References Cited

U.S. PATENT DOCUMENTS

2012/0176923 A1* 7/2012 Hsu ................. H04W 52/243
  370/252
2012/0195298 A1* 8/2012 Kuo ................. H04W 4/06
  370/338

(Continued)

OTHER PUBLICATIONS

International Search Report issued on Mar. 21, 2013 in International Application PCT/KR2012/008353.
(Continued)

Primary Examiner — Tejis Daya

(57) ABSTRACT

Method and apparatus for controlling in-device coexistence (IDC) interference in a wireless communication system are described in the present invention. The present invention includes transmitting UE capability information whether the UE has a capability to measure IDC, to a base station (BS); receiving measurement configuration information whether the UE is allowed to send IDC indication, from the BS; and transmitting the IDC indication and at least one of measurements which are a measurement in consideration of IDC and a measurement without consideration of IDC to the BS. It is possible to control reducing occurrence of in-device coexistence interference.

17 Claims, 21 Drawing Sheets

Related U.S. Application Data continuation of application No. 13/651,034, filed on Oct. 12, 2012, now Pat. No. 8,917,619.

(51) Int. Cl.
| | | |
|---|---|---|
| *H04B 15/00* | (2006.01) | |
| *H04W 72/08* | (2009.01) | |
| *H04L 5/00* | (2006.01) | |
| *H04W 24/02* | (2009.01) | |
| *H04W 72/04* | (2009.01) | |
| *H04W 72/12* | (2009.01) | |
| *H04W 88/06* | (2009.01) | |

(52) U.S. Cl.
CPC ....... *H04W 24/02* (2013.01); *H04W 72/0446* (2013.01); *H04W 72/082* (2013.01); *H04W 72/1215* (2013.01); *H04W 88/06* (2013.01)

(56) References Cited

U.S. PATENT DOCUMENTS

| | | | |
|---|---|---|---|
| 2012/0207040 A1* | 8/2012 | Comsa | H04W 72/1215 370/252 |
| 2012/0213162 A1 | 8/2012 | Koo et al. | |
| 2012/0252442 A1* | 10/2012 | Fu | H04W 24/10 455/426.1 |
| 2013/0208641 A1 | 8/2013 | Baghel et al. | |
| 2013/0324172 A1* | 12/2013 | Ahn | H04W 36/0094 455/501 |
| 2016/0135213 A1* | 5/2016 | Zhu | H04L 1/00 370/329 |

OTHER PUBLICATIONS

Alcatel-Lucent, et al., "Remaining issues on Indicaton", R2-115340, 3GPP TSG RAN WG2 #75bis, Oct. 10-14, 2011, Zhuhai, China.
LG Electronics Inc., "Necessary procedure for avoiding ping-pong to problematic frequency", R2-115430, 3GPP TSG RAN WG2 #75bis, R2-115430, Oct. 10-14, 2011, Zhuhai, China.
3GPP TR 36.816 V11.1.0, "Study on signalling and procedure for interference avoidance for in-device coexistence", Sep. 30, 2011.
Non-final Office Action issued on Apr. 11, 2014 in U.S. Appl. No. 13/651,034.
Notice of Allowance issued on Aug. 12, 2014 in U.S. Appl. No. 13/651,034.
Qualcomm Incorporated, "Necessary solutions methods for InDevice Coexistence," 3GPP TSG-RAN WG2 Meeting #74, R2-113352, May 9 thru May 13, 2011, Barcelona, Spain.
Nokia Siemens Networks, Nokia Corp., "IDC Signalling to Target eNB," 3GPP TSG-RAN WG2 Meeting #74, R2-112861, May 9 thru 13, 2011, Barcelona, Spain.
Zhenping Hu, et al., "Interference Avoidance for In-Device Coexistence in 3GPP LTE-Advanced: Challenges and Solutions," IEEE Communications Magazine pp. 60 thru 67, Nov. 2012.
Pantech, "Measurement on in-device coexistence circumstances," 3GPP TSG-RAN WG2 Meeting #75bis, R2-115187, Oct. 10 thru 15, 2011, Zhuhai, China.
Pantech, "IDC trigger procedure," 3GPP TSG-RAN WG2 Meeting #76, R2-116047, Nov. 14 thru 18, 2011, San Francisco, USA.
Pantech, "Text proposal on clarification of on-going interference in ICO," 3GPP TSG-RAN WG2 Meeting #74, R2-112913, May 9 thru 13, 2011, Barcelona, Spain.
Ericsson, ST-Ericsson, "Way forward for IDC interference avoidance," 3GPP TSG-RAN WG2 #73bis, Tdoc R2-113033, May 9 thru 13, 2011, Barcelona, Spain.
CMCC, ZTE, CATT, Intel Corp., Huawei, Qualcomm Incorp., MediaTek, Pantech, Research in Motion UK Limited, "Way forward on in-device coexistence SI," 3GPP TSG-RAN WG2 Meeting #74, R2-113196, May 9 thru 13, 2011, Barcelona, Spain.
CMCC, CATT, Huawei, "Indication of update of coexistence interference," 3GPP TSG-RAN WG2 Meeting #74, R2-113188, May 9 thru 13, 2011, Barcelona, Spain.
3GPP TR36.816, v1.3.0., "Study on signalling and procedure for interference avoidance for in-device coexistence," Apr. 2011.
Pantech, "Operation scenarios of ICO," 3GPP TSG-RAN WG2 Meeting #75bis, R2-115188, Oct. 10 thru 15, 2011, Zhuhai, China.
Non-Final Office Action dated Apr. 27, 2015, in U.S. Appl. No. 14/560,838.
Final Office Action dated Nov. 20, 2015, in U.S. Appl. No. 14/560,838.
Notice of Allowance dated Feb. 22, 2016, in U.S. Appl. No. 14/560,838.

* cited by examiner

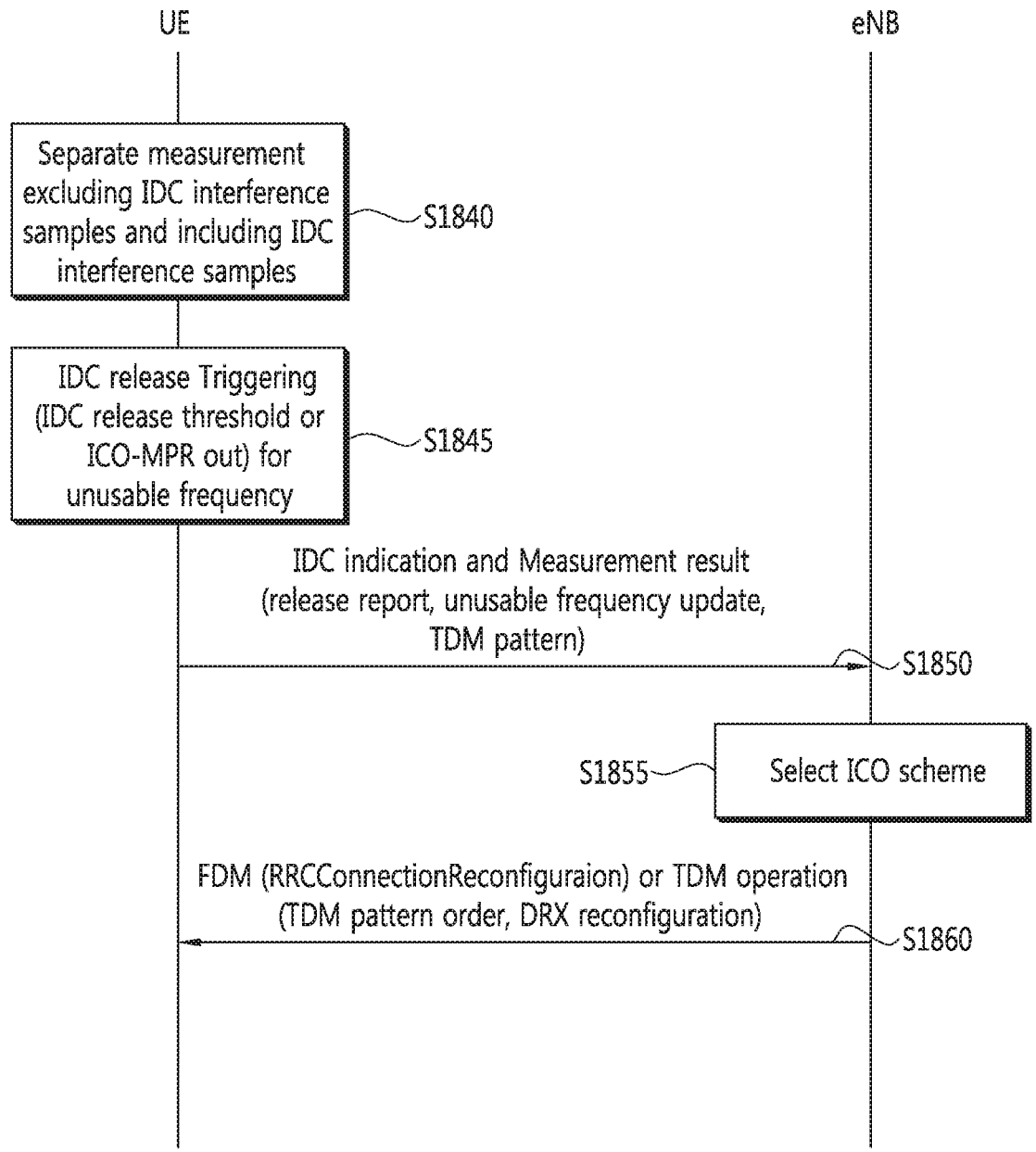

APPARATUS AND METHOD FOR CONTROLLING IN-DEVICE COEXISTENCE INTERFERENCE IN WIRELESS COMMUNICATION SYSTEM

CROSS-REFERENCE TO RELATED APPLICATIONS

This application is a continuation of U.S. patent application Ser. No. 14/560,838, filed on Dec. 4, 2014, which is a continuation of U.S. patent application Ser. No. 13/651,034, filed on Oct. 12, 2012, now issued as U.S. Pat. No. 8,917, 619, and claims priority from and the benefit under 35 U.S. C. §119(a) of Korean Patent Application Nos. 10-2011-0105483, filed on Oct. 14, 2011, and 10-2011-0110798, filed on Oct. 27, 2011, each of which is incorporated herein by reference for all purposes as if fully set forth herein.

BACKGROUND

Field

The following disclosure relates to a wireless communication system, and more particularly, to an apparatus and a method for controlling in-device coexistence interference in a wireless communication system.

Discussion of the Background

A wireless communication system generally uses one bandwidth for transmitting data. For example, a 2-generation wireless communication system uses a bandwidth in the range of 200 KHz to 1.25 MHz and a 3-generation wireless communication system uses a bandwidth in the range of 5 MHz to 10 MHz. In order to support an increased transmission capacity, 3rd generation partnership project (3GPP) long term evolution (LTE) or IEEE 802.16m has extended a bandwidth thereof up to 20 MHz or more in recent years. The bandwidth may need to increase so as to increase the transmission capacity, but supporting a large bandwidth even when a required service level is low may cause large power consumption.

Therefore, a multiple component carrier system has appeared, which defines a carrier having one bandwidth and one center frequency, and can transmit or receive data in a wideband through a plurality of carriers. A narrowband and the wideband are simultaneously supported by using one or more carriers. For example, when one carrier corresponds to a bandwidth of 5 MHz, a bandwidth of maximum 20 MHz is supported by using four carriers.

Due to a ubiquitous connection network of today, user can access different networks in different regions and continuously keep connectivity wherever. In the related art in which one terminal communicates with one network system, the user carried different equipments supporting respective network systems. However, in recent years, as functions of a single terminal have been advanced and complicated, the user can communicate with a plurality of network systems simultaneously by using only the single terminal and user convenience has increased.

However, when one terminal performs communication on a plurality of network system bands simultaneously, In-Device Coexistence interference (IDC) may occur. The in-device coexistence interference (IDC) means interference when transmission in any one frequency band interferes in reception in another frequency band. For example, the in-device coexistence interference may occur between a Bluetooth system band and a 802.16 system band when one terminal supports both a Bluetooth system and a 802.16 system. The in-device coexistence interference may occur primarily when a spacing interval of a frequency band boundary of a heterogeneous network system is not sufficiently large.

In this regard, various in-device coexistence interference avoidance (ICO) techniques are proposed.

SUMMARY

Exemplary embodiments of the present invention provide an apparatus and a method for controlling in-device coexistence interference.

Exemplary embodiments of the present invention also provide an apparatus and a method for transmitting information for coordinating in-device coexistence interference.

Exemplary embodiments of the present invention also provide an apparatus and a method for receiving information of coordinating in-device coexistence interference.

Exemplary embodiments of the present invention also provide an apparatus and a method for triggering operation of coordinating in-device coexistence interference.

Exemplary embodiments of the present invention also provide an apparatus and a method for performing measurement of coordinating in-device coexistence interference.

Exemplary embodiments of the present invention also provide an apparatus and a method for transmitting information regarding whether the UE support an operation relating to IDC interference.

Exemplary embodiments of the present invention also provide an apparatus and a method for transmitting information regarding whether the BS allows the UE to transmit IDC indication Exemplary embodiments of the present invention also provide an apparatus and a method for transmitting information indicating whether the UE entry or release IDC situation.

In an aspect, a method for controlling In-Device Coexistence interference (IDC) by a User Equipment (UE) in a wireless communication system comprises transmitting UE capability information whether the UE has a capability to measure IDC, to a base station (BS); receiving measurement configuration information whether the UE is allowed to send IDC indication, from the BS; and transmitting the IDC indication and at least one of measurements which are a measurement in consideration of IDC and a measurement without consideration of IDC to the BS.

In another aspect, a method for controlling In-Device Coexistence interference (IDC) by a Base Station (BS) in a wireless communication system comprises receiving User Equipment (UE) capability information whether a UE has a capability to measure IDC, from the UE; transmitting measurement configuration information whether the UE is allowed to send IDC indication to the UE; and receiving the IDC indication and at least one of measurements which are a measurement in consideration of IDC and a measurement without consideration of IDC from the UE.

In another aspect, a User Equipment (UE) for controlling In-Device Coexistence interference (IDC) in a wireless communication system comprises a transmitting unit transmitting UE capability information whether the UE has a capability to measure IDC, to a base station (BS); and a receiving unit receiving measurement configuration information whether the UE Is allowed to send IDC indication from the BS, wherein the transmitting unit transmits the IDC indication and at least one of measurements which are a measurement in consideration of IDC and a measurement without consideration of IDC to the BS.

In another aspect, a Base Station (BS) for controlling In-Device Coexistence interference (IDC) in a wireless communication system comprises a receiving unit receiving User Equipment (UE) capability information whether a UE has a capability to measure IDC, from the UE; and a transmitting unit transmitting measurement configuration information whether the UE is allowed to send IDC indication to the UE, wherein the receiving unit receives the IDC indication and at least one of measurements which are a measurement in consideration of IDC and a measurement without consideration of IDC from the UE.

It is possible to control reducing occurrence of in-device coexistence interference. More particularly, it is possible to be triggered properly not to perform excessively or shortly. And user equipment can choose and perform a proper in-device coexistence interference avoidance operation when triggered.

BRIEF DESCRIPTION OF THE DRAWINGS

FIGS. 18A and 18B are flow charts illustrating another example of operations of the UE and the BS that perform IDC interference control.

DETAILED DESCRIPTION OF THE ILLUSTRATED EMBODIMENTS

Figure 1:
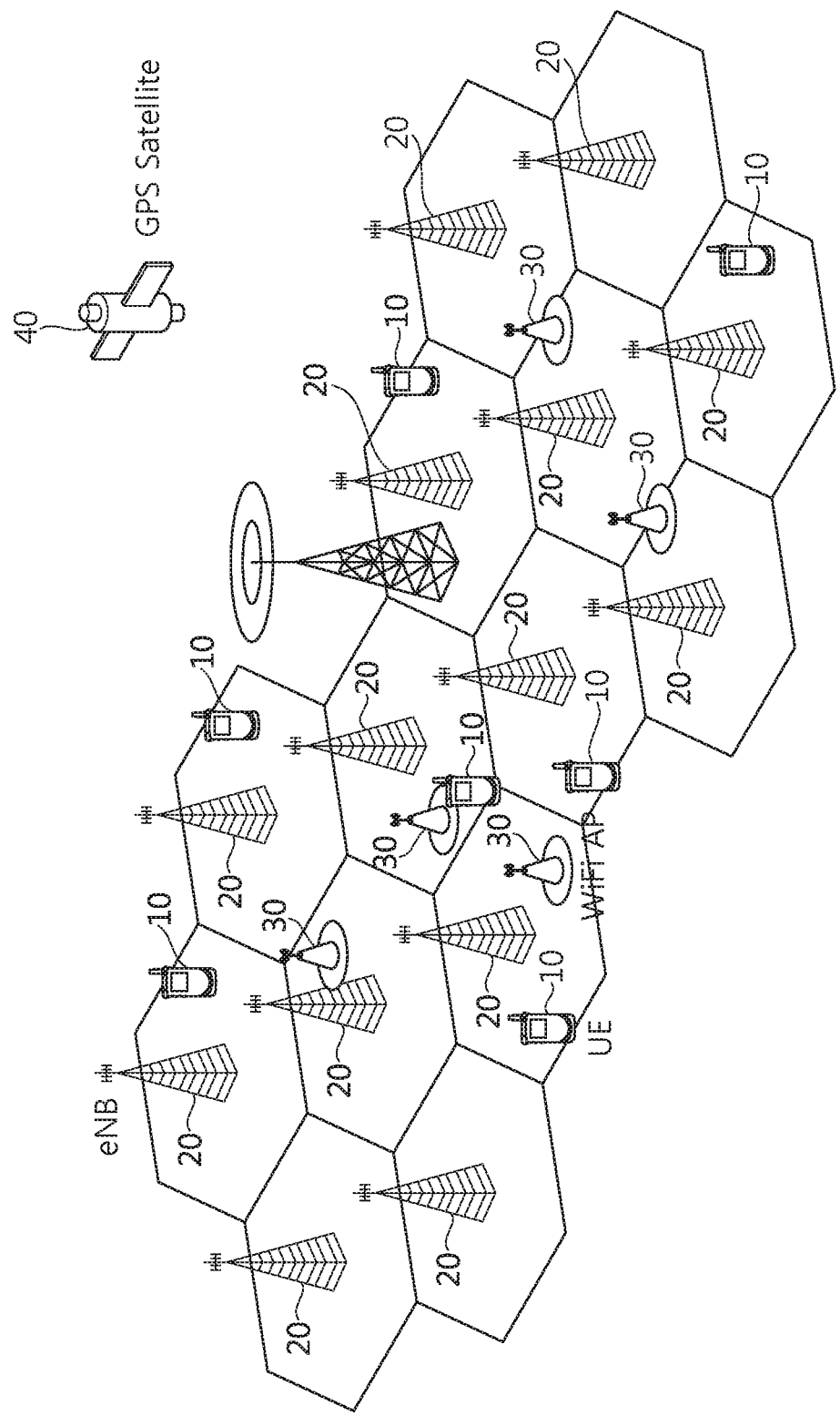
FIG. 1 illustrates a wireless communication system according to exemplary embodiments of the present invention.

Hereinafter, in this specification, some exemplary embodiments will be described in detail with reference to the accompanying drawings. In adding reference numerals to components throughout the drawings, it is to be noted that like reference numerals designate like components even though components are shown in different drawings. Further, in describing the exemplary embodiments of the present invention, well-known functions or constructions will not be described in detail since they may unnecessarily obscure the understanding of the exemplary embodiments of the present invention.

Further, in describing components of the specification, terms such as first, second, A, B, (a), (b), and like may be used. These terms are just used to discriminate the components from other components and a property, an order, or a sequence of the corresponding component is not limited by the term. It will be understood that when an element is simply referred to as being "connected to" or "coupled to" another element without being "directly connected to" or "directly coupled to" another element in the present description, it may be "directly connected to" or "directly coupled to" another element or be connected to or coupled to another element, having the other element intervening there between.

FIG. 1 illustrates a wireless communication system according to exemplary embodiments of the present invention.

Referring to FIG. 1, the wireless communication system is widely placed in order to provide various communication services including voice, packet, data, and the like, and includes a terminal (also may called as a user equipment (UE)) 10, a base station (BS, or called as a evolved NodeB (eNB)) 20, a wireless LAN access point (AP) 30, a global positioning system (GPS) 40, and a satellite. Herein, a wireless LAN is a device supporting IEEE 802.11 technology which a wireless standard and the IEEE 802.11 may be mixed with a WiFi system.

The UE 10 may be positioned in coverage of a plurality of networks including a cellular network, a wireless LAN broadcast network, a satellite system, and the like. The UE 10 is provided with a plurality of wireless transceivers in order to access various networks and various services regardless of place and time. For example, a smart phone is provided with long term evolution (LTE), WiFi Bluetooth transceiver, and a GPS receiver. A design of the UE 10 becomes more complicated in order to integrate more and more transceivers in one same UE 10 while maintaining excellent performance. As a result, a possibility that in-device coexistence interference (IDC) in the UE will occur may be further increased.

Hereinafter, a downlink (DL) indicates communication from the eNB 20 and an uplink (UL) indicates communication from the UE 10 to the eNB 20. In the downlink, a transmitter may be a part of the eNB 20 and a receiver may be a part of the UE 10. In the uplink, the transmitter may be a part of the UE 10 and a receiver may be a part of the eNB 20.

The UE 10 may be fixed or have mobility, and may be called other terms such as a mobile station (MS), a user terminal (UT), a subscriber station (SS), a mobile terminal (MT), a wireless device, and the like. The eNB 20 indicates a fixed station that communicates with the UE 10 and may be called other terms such as a base station (BS), a base transceiver system (BTS), an access point, a femto base station (BS), a relay, and the like.

Multiple access techniques applied to the wireless communication system are not limited. Various multiple access techniques such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA may be used. In uplink transmission and downlink transmission, a time division duplex (TDD) scheme in which transmission is performed by using different times may be used or a frequency division duplex (FDD) scheme in which transmission is performed by using different frequencies may be used.

Figure 2:
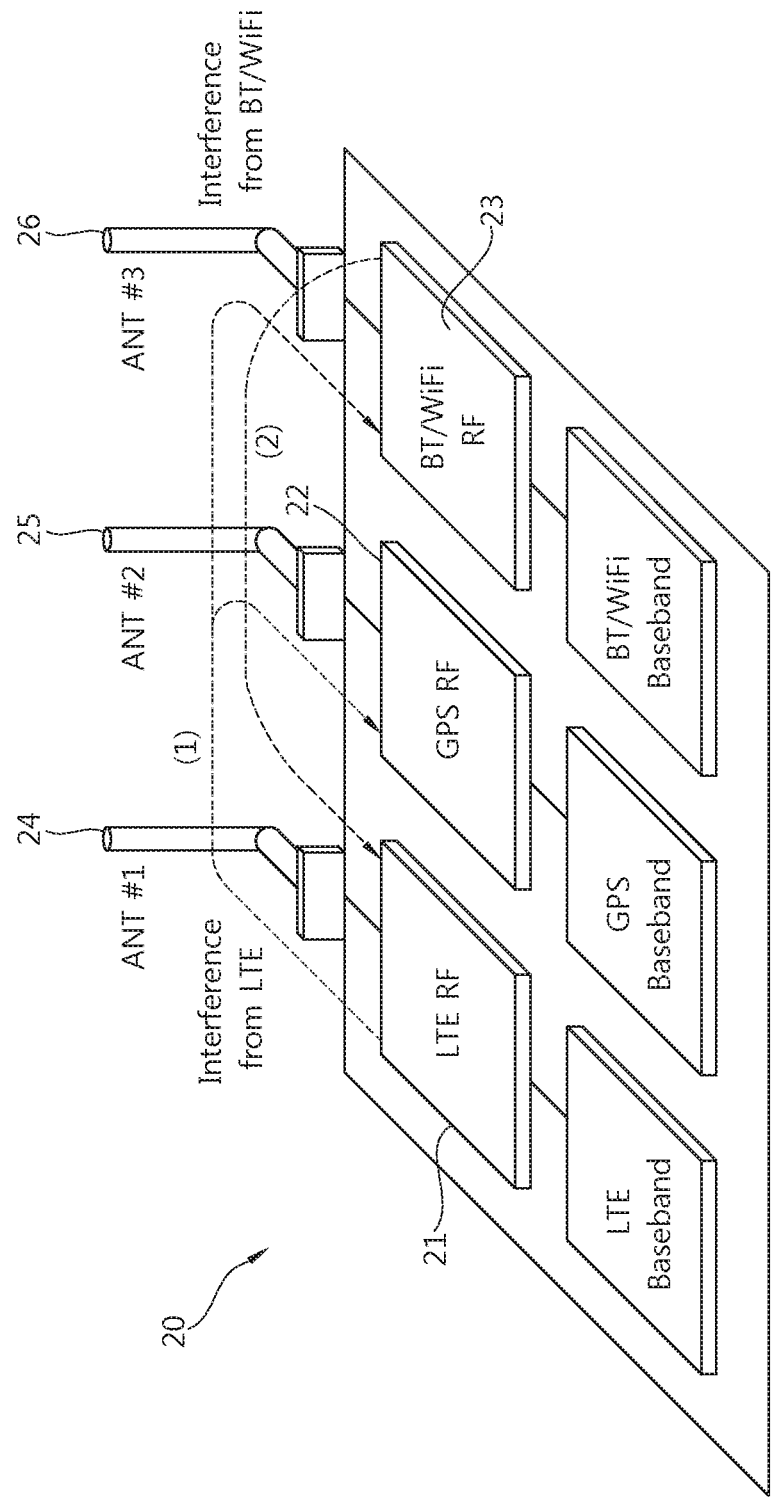
FIG. 2 is an explanatory diagram describing in-device coexistence interference.

FIG. 2 is an explanatory diagram describing in-device coexistence interference.

Referring to FIG. 2, the eNB 20 includes an LTE RF 21, a GPS RF 22, and a Bluetooth/WiFi RF 23. Transceiving antennas 24, 25, and 26 are connected to the respective RFs. That is, various types of RFs are closely mounted in one device platform. Herein, transmission power of one RF may be much larger than a reception power level into another RF receiver. In this case, if an interval in frequency between the RFs is not sufficient and a filtering technique is not supported, a transmission signal of any RF may cause remarkable interference in a receiver of another RF within the device. For example, "(1)" is an example in which the transmission signal of the LTE RF 21 causes the in-device coexistence interference in the GPS RF 22 and the Bluetooth/WiFi RF 23 and "(2)" is an example in which the transmission signal of the Bluetooth/WiFi RF 23 causes the in-device coexistence interference in the LTE RF 21.

Figure 3:
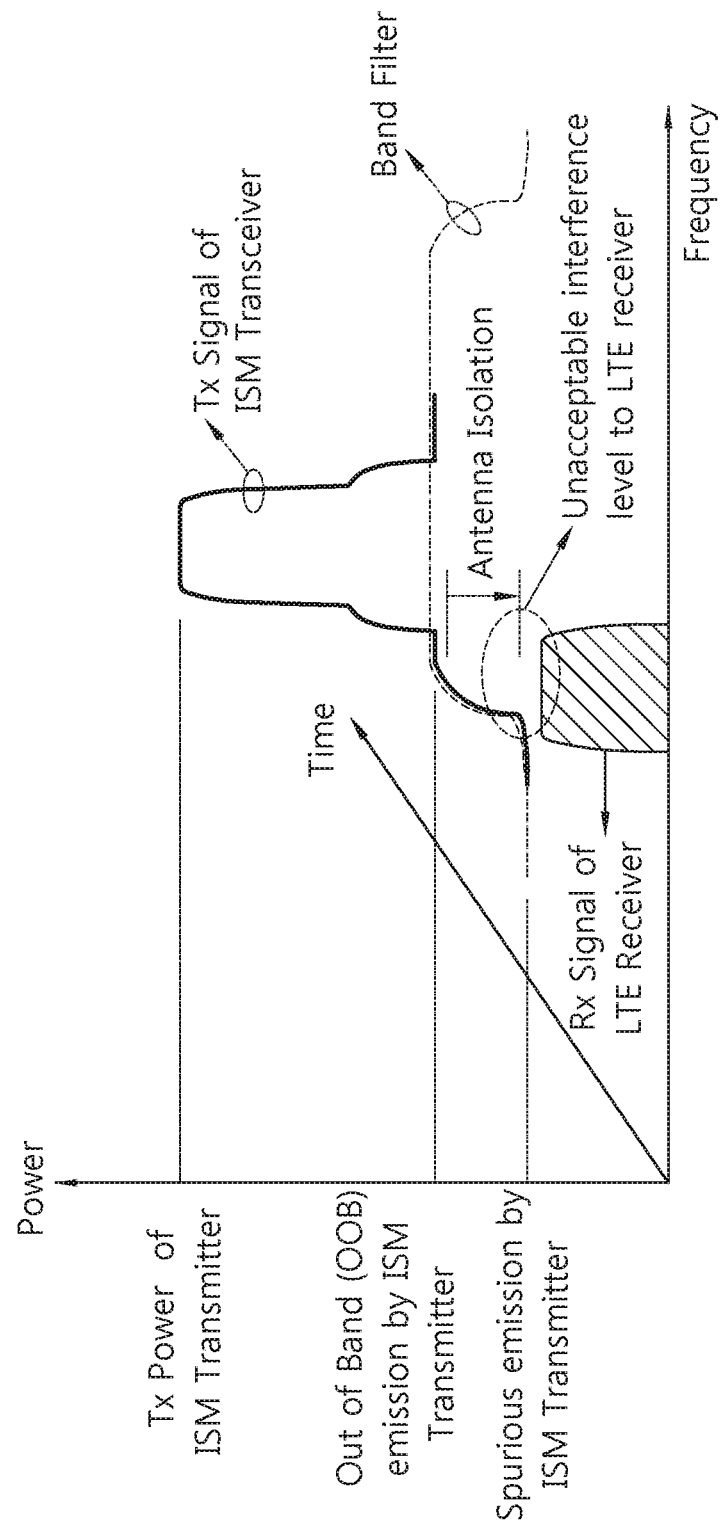
FIG. 3 is an example illustrating the in-device coexistence interference from an industrial, scientific and medical transmitter to an LTE receiver.

FIG. 3 is an example illustrating the in-device coexistence interference from an industrial, scientific and medical (ISM) transmitter to an LTE receiver. The ISM band indicates a band which may be arbitrarily used without authorizing the use in industrial, scientific, and medical fields.

Referring to FIG. 3, a band of a signal received by the LTE receiver overlaps with a band of a transmission signal of the ISM transmitter. In this case, the in-device coexistence interference may occur.

Figure 4:
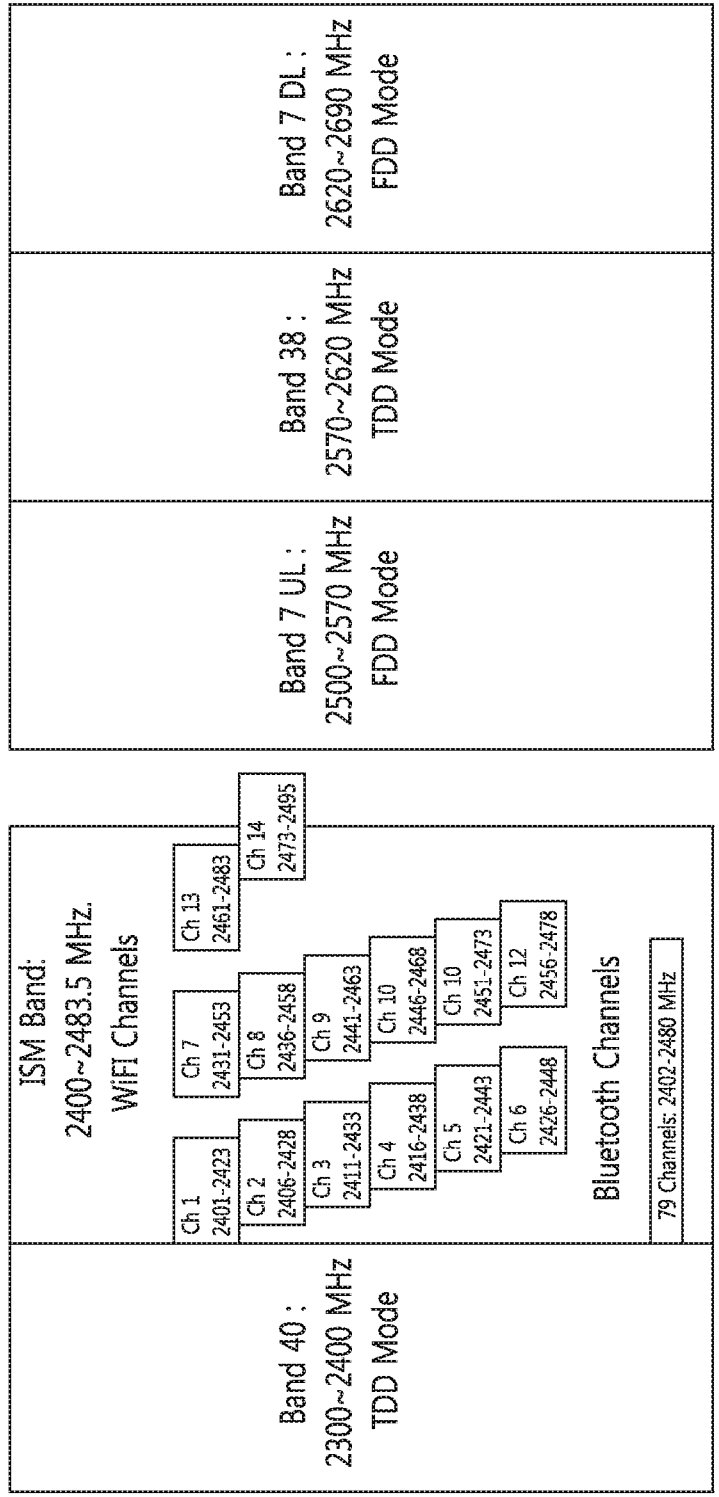
FIG. 4 is an example in which a band is divided into an ISM band and an LTE band on a frequency band.

FIG. 4 is an example in which a band is divided into an ISM band and an LTE band on a frequency band.

Referring to FIG. 4, a band 40, a band 7, and a band 38 are LTE bands. The band 40 occupies a band in the range of 2300 to 2400 MHz in a TDD mode and the band 7 occupies a band in the range of 2500 to 2570 MHz as the uplink in an FDD mode. In addition, the band 38 occupies a band in the range of 2570 to 2620 MHz in the TDD mode. Meanwhile, the ISM band is used as a WiFi channel and a Bluetooth channel, and occupies a band in the range of 2400 to 2483.5 MHz. Herein, a condition in which the in-device coexistence interference occurs is illustrated in Table 1 below.

TABLE 1

| Interference band | Pattern of interference |
| --- | --- |
| Band 40 | ISM Tx -> LTE TDD DL Rx |
| Band 40 | LTE TDD UL Tx -> ISM Rx |
| Band 7 | LTE FDD UL Tx -> ISM Rx |
| Band 7/13/14 | LTE FDD UL Tx -> GPS Rx |

Referring to Table 1, a mark of "a>b" in the interference pattern illustrates a condition in which a transmitter a causes the in-device coexistence interference to a receiver b. Therefore, in the band 40, the ISM transmitter causes the in-device coexistence interference to an LTE-band downlink TDD receiver (LTE DL TDD Rx). The in-device coexistence interference may be alleviated to some extent by a filtering scheme, but is not sufficient to alleviate the in-device coexistence interference. When a frequency division multiplex (FDM) scheme is additionally applied to the filtering scheme, the in-device coexistence interference may be more efficiently alleviated.

Figure 5:
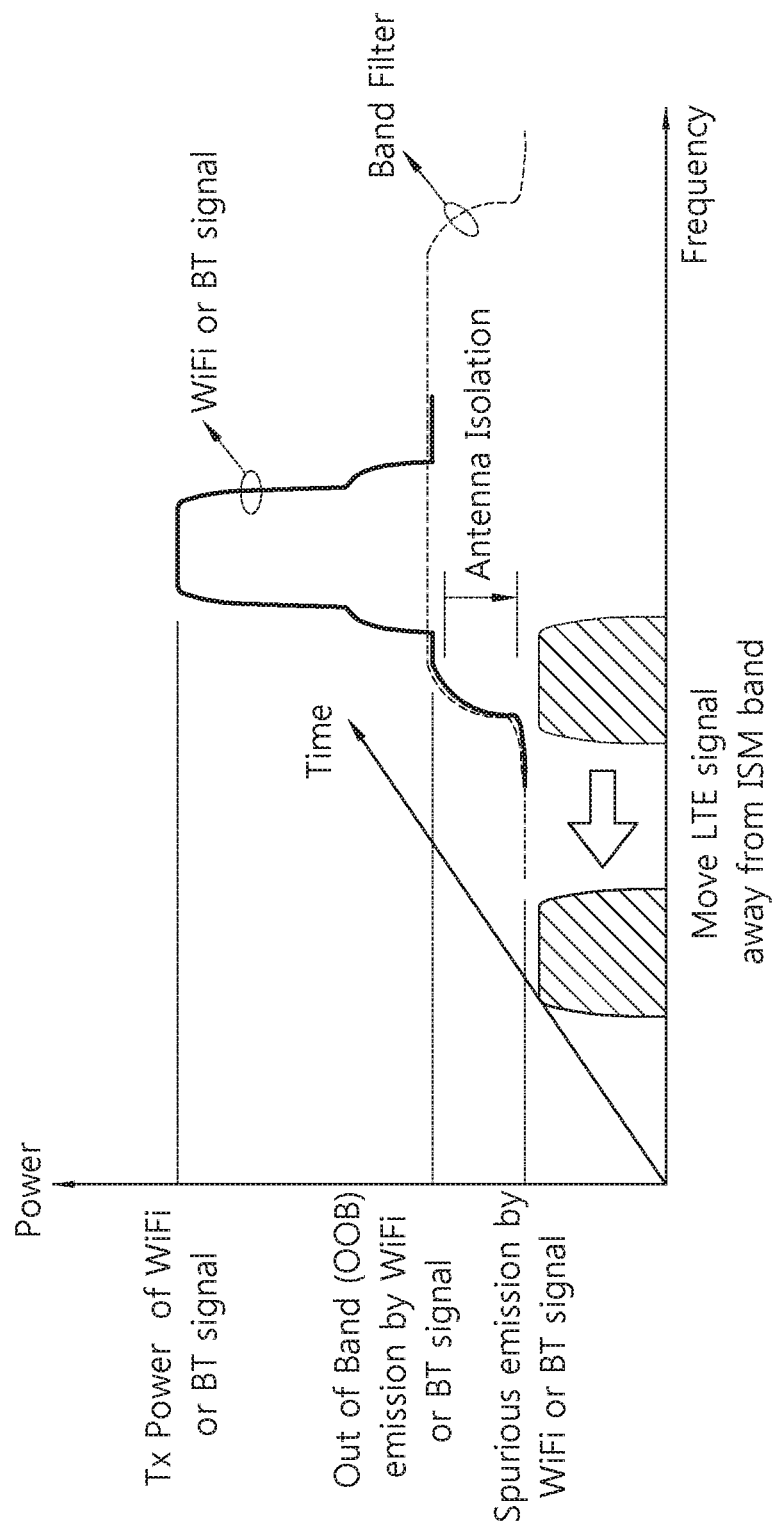
FIG. 5 is an explanatory diagram illustrating one example of alleviating the in-device coexistence interference by using an FDM scheme according to exemplary embodiments of the present invention.

FIG. 5 is an explanatory diagram illustrating one example of alleviating the in-device coexistence interference by using an FDM scheme according to exemplary embodiments of the present invention.

Referring to FIG. 5, the LTE band may be moved so as to prevent the LTE band and the ISM band from overlapping with each other. As a result, a handover of the terminal is induced from the ISM band. However, to this end, a method in which legacy measurement or new signaling accurately triggers a mobility procedure or a radio link failure (RLF) procedure is required. Alternatively, a part which becomes a problem associated with the ISM in the LTE band may be avoided through a filtering or resource allocation technique. Alternatively, overlapping interference may be avoided with respect to a case in which LTE carriers are compiled through a procedure of reconfiguring a set of used carriers.

Figure 6:
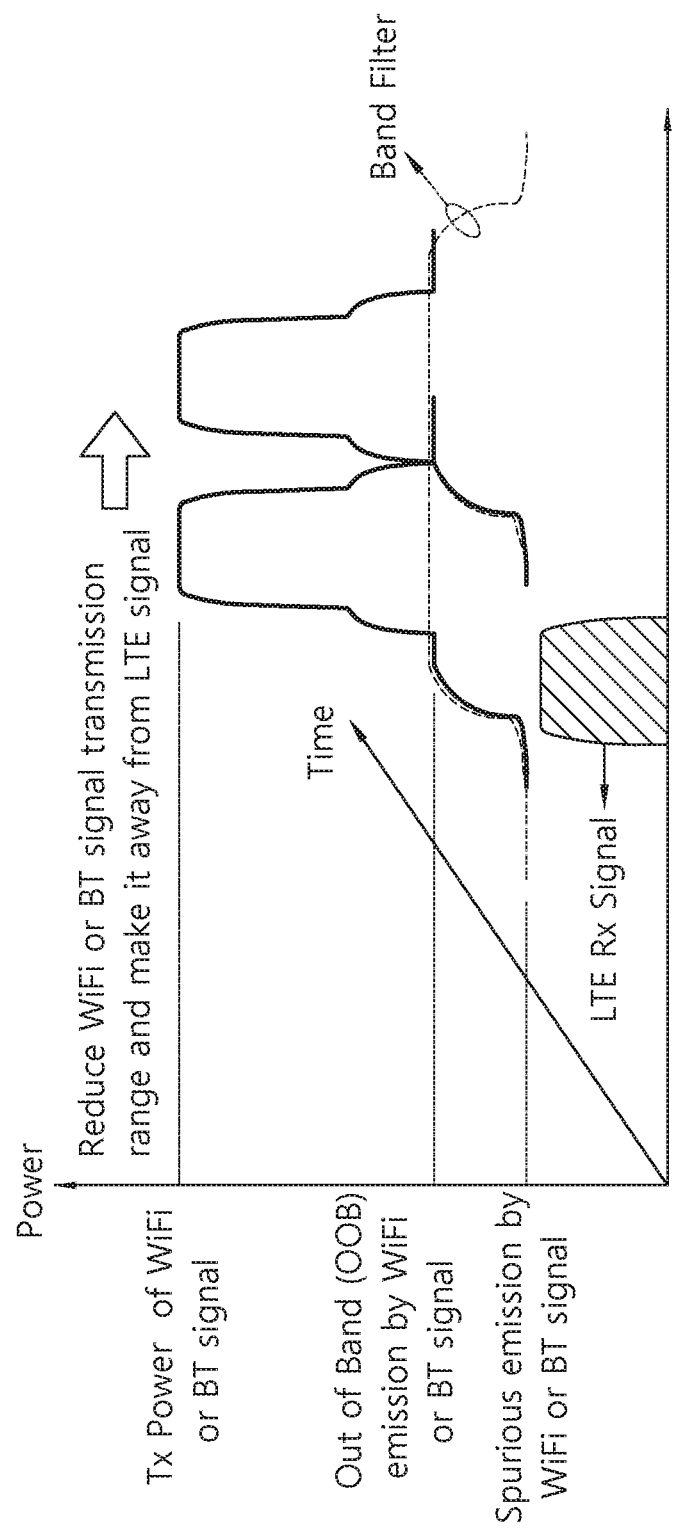
FIG. 6 is an explanatory diagram illustrating another example of alleviating the in-device coexistence interference by using the FDM scheme according to exemplary embodiments of the present invention.

FIG. 6 is an explanatory diagram illustrating another example of alleviating the in-device coexistence interference by using the FDM scheme according to exemplary embodiments of the present invention.

Referring to FIG. 6, the ISM band may be reduced and moved so as to be spaced apart from the LTE band. However, in this scheme, backward compatibility problem may occur. In the case of the Bluetooth, the backward compatibility problem may be resolved due to an adaptive frequency hopping mechanism to some extent, but in the case of the WiFi, it may be difficult to resolve the backward compatibility problem.

Figure 7:
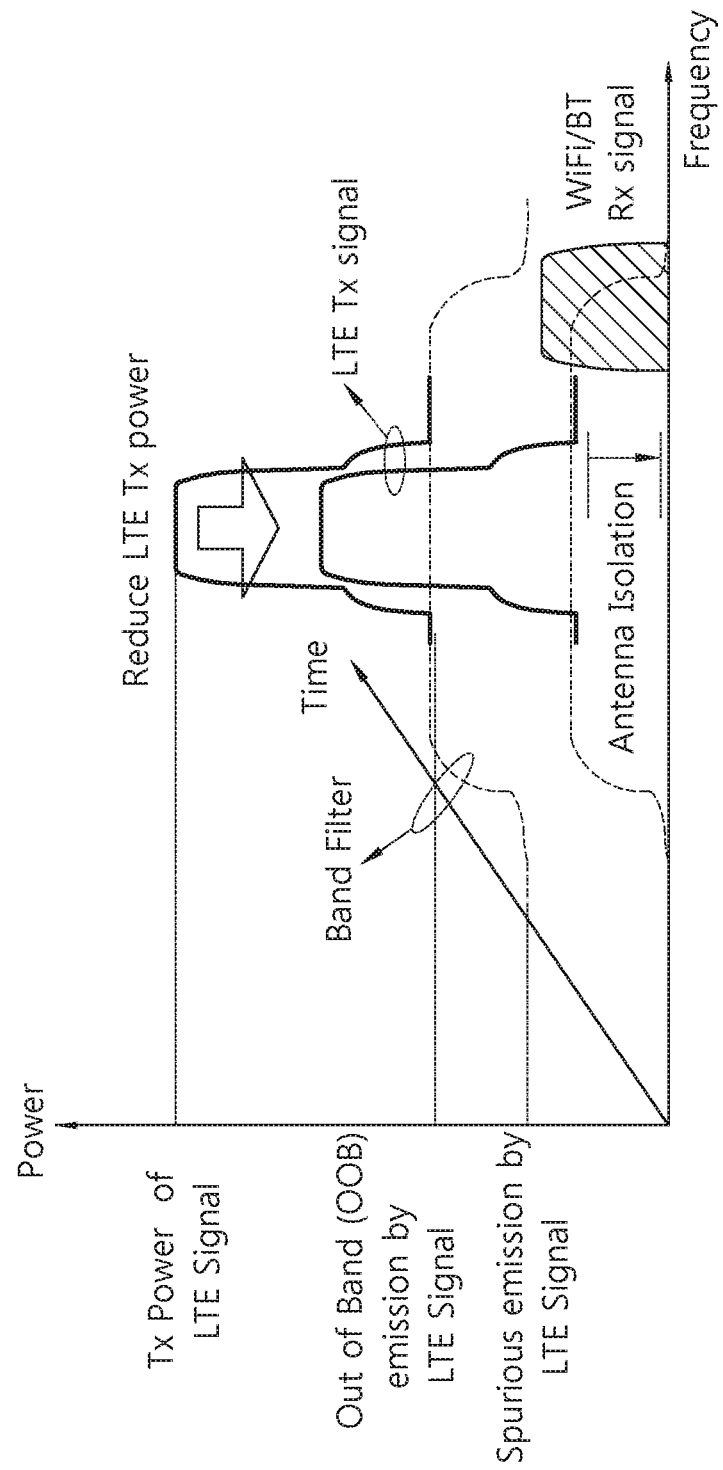
FIGS. 7 and 8 are explanatory diagrams illustrating one example of alleviating the in-device coexistence interference by using a power control scheme according to exemplary embodiments of the present invention.
Figure 8:
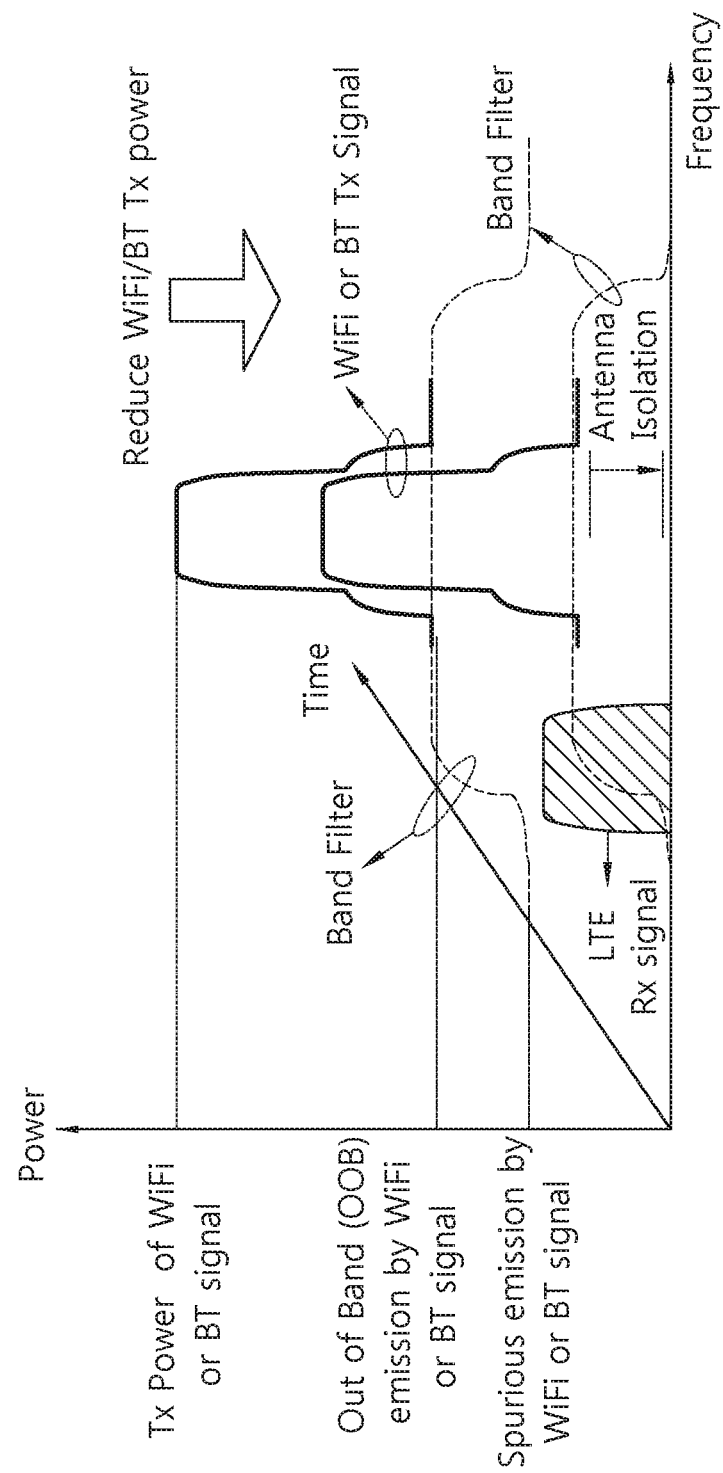

FIGS. 7 and 8 are explanatory diagrams illustrating one example of alleviating the in-device coexistence interference by using a power control (PC) scheme according to exemplary embodiments of the present invention.

Referring to FIG. 7, the terminal avoids the in-device coexistence interference by lowering transmission power of the LTE signal by a predetermined level to improve reception quality of the ISM band and referring to FIG. 8, the terminal avoids the in-device coexistence interference by lowering transmission power of the ISM band by a predetermined level to improve reception quality of the LTE signal.

Figure 9:
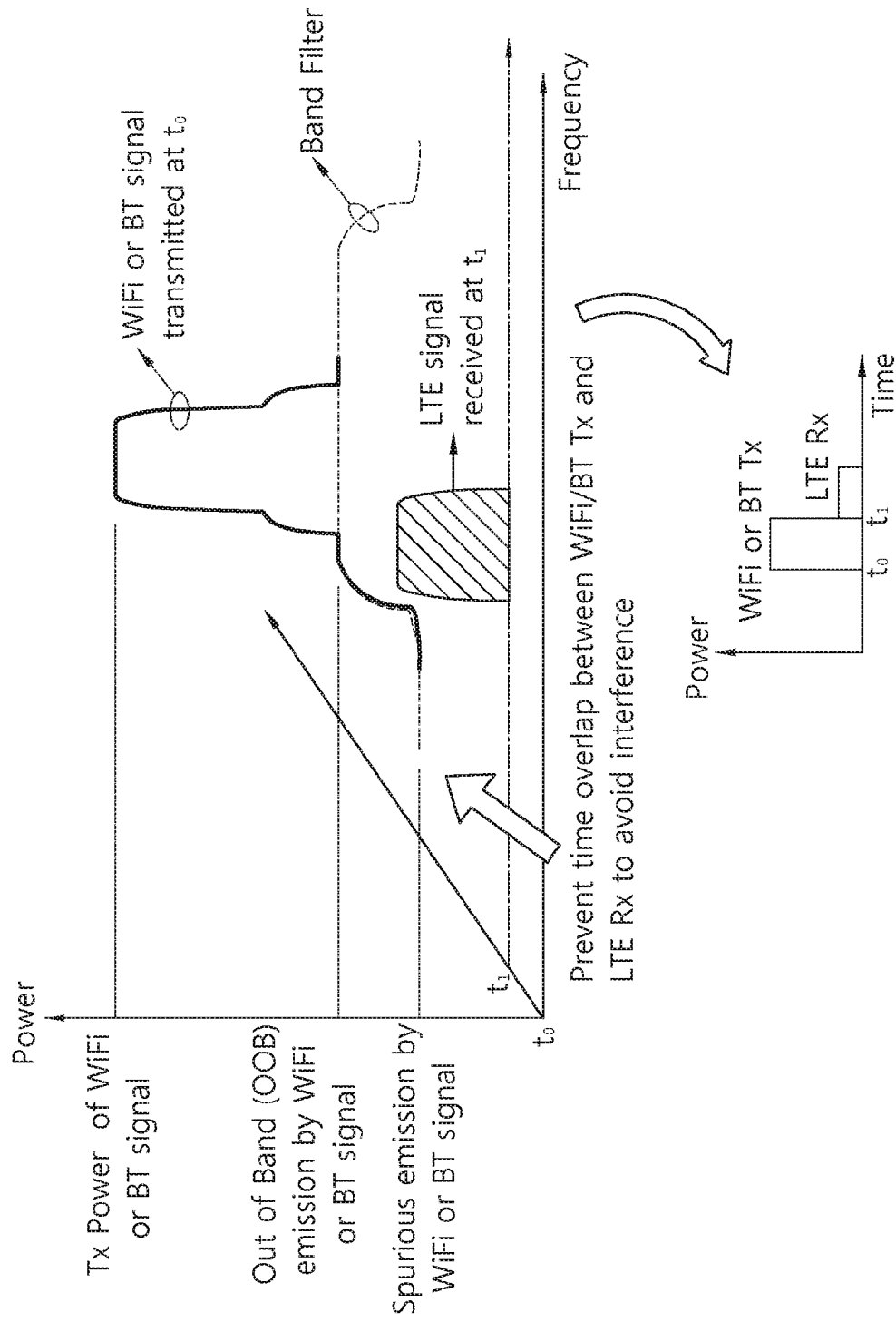
FIGS. 9 and 10 are explanatory diagrams illustrating one example of alleviating the in-device coexistence interference by using the time division multiplex scheme according to exemplary embodiments of the present invention.

FIG. 9 is an explanatory diagram illustrating one example of alleviating the in-device coexistence interference by using the time division multiplex (TDM) scheme according to exemplary embodiments of the present invention.

Referring to FIG. 9, when a reception time of the LTE signal is prevented from overlapping with a transmission time in the ISM band, the in-device coexistence interference may be avoided. For example, when the signal in the ISM band is transmitted at t0, the LTE signal is received at $t_1$. As such, according to exemplary embodiments of the present invention, is transmission/reception timings on time axes in the LTE band and the ISM band using the TDM scheme may be illustrated in FIG. 10.

Figure 10:
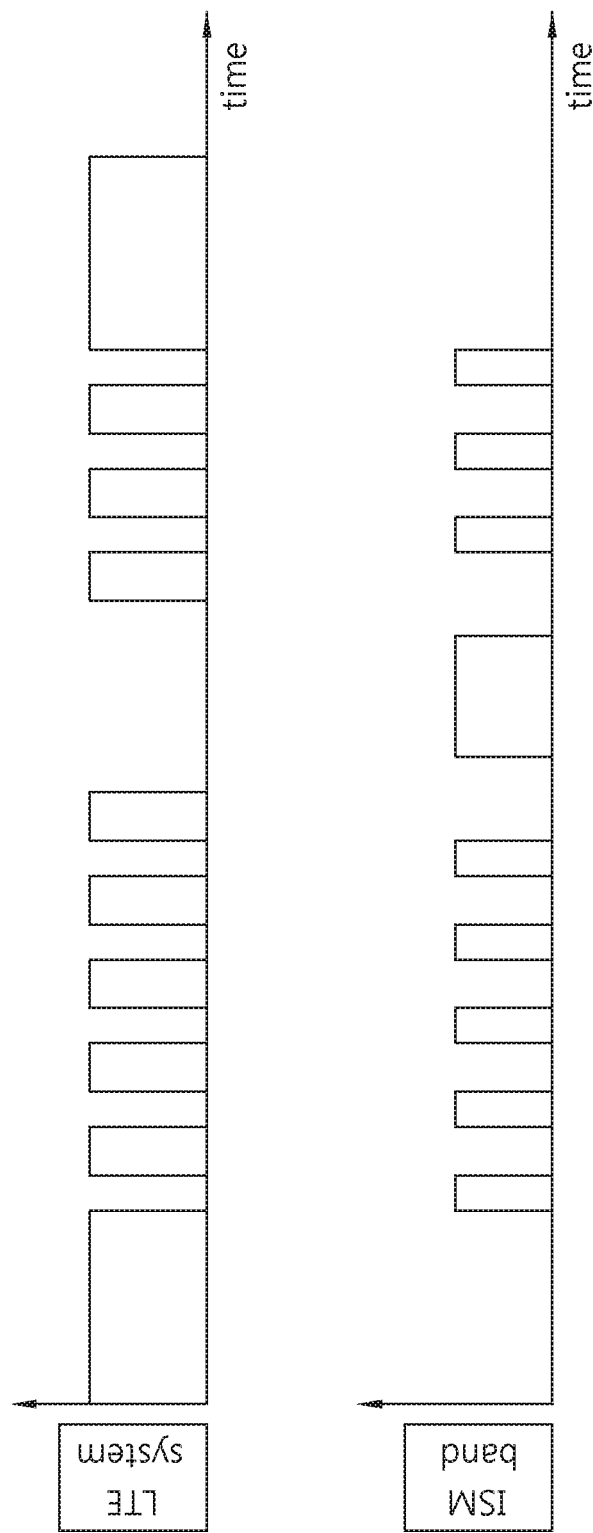

Referring to FIG. 10, the in-device coexistence interference may be avoided without movement between the LTE band and the ISM band by the scheme of FIG. 9.

Figure 11:
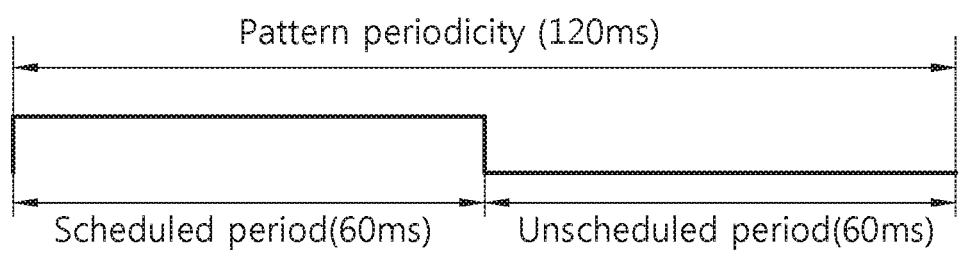
FIG. 11 is a diagram illustrating another example of alleviating the in-device coexistence interference by using the TDM scheme according to exemplary embodiments of the present invention.

FIG. 11 is a diagram illustrating another example of alleviating the in-device coexistence interference by using the TDM scheme according to exemplary embodiments of the present invention.

Referring to FIG. 11, a predetermined pattern periodicity interval is divided into a scheduled period interval and an unscheduled period interval to avoid the in-device coexistence interference by the TDM scheme based on discontinuous reception (DRX).

Mutual interference between the LTE and the ISM is avoided by preventing the LTE from being transmitted within the unscheduled period interval. However, primary LTE transmission such as random access and hybrid automatic repeat request (HARQ) retransmission may be permitted even within the scheduled period interval.

Mutual interference between the LTE and the ISM is avoided by preventing the ISM from being transmitted and permitting the LTE to be transmitted within the scheduled period interval. The primary ISM transmission such as Beacon or WiFi may be permitted even within the scheduled period interval, similarly as the unscheduled period interval. The LTE transmission may be prevented in order to protect the primary ISM transmission. Special signaling for protecting the primary ISM transmission such as Beacon may be added. As one example, a period of the Beacon signaling and information on a subframe offset may be added. In this case, the subframe offset number and the system frame number may be determined based on 0. The system frame number may have one of 0 to 1023 by the unit of a radio frame in the LTE system. One radio frame is constituted by ten subframes. When the corresponding subframe offset number and system frame number are known, an accurate frame position may be known in the corresponding system.

Figure 12:
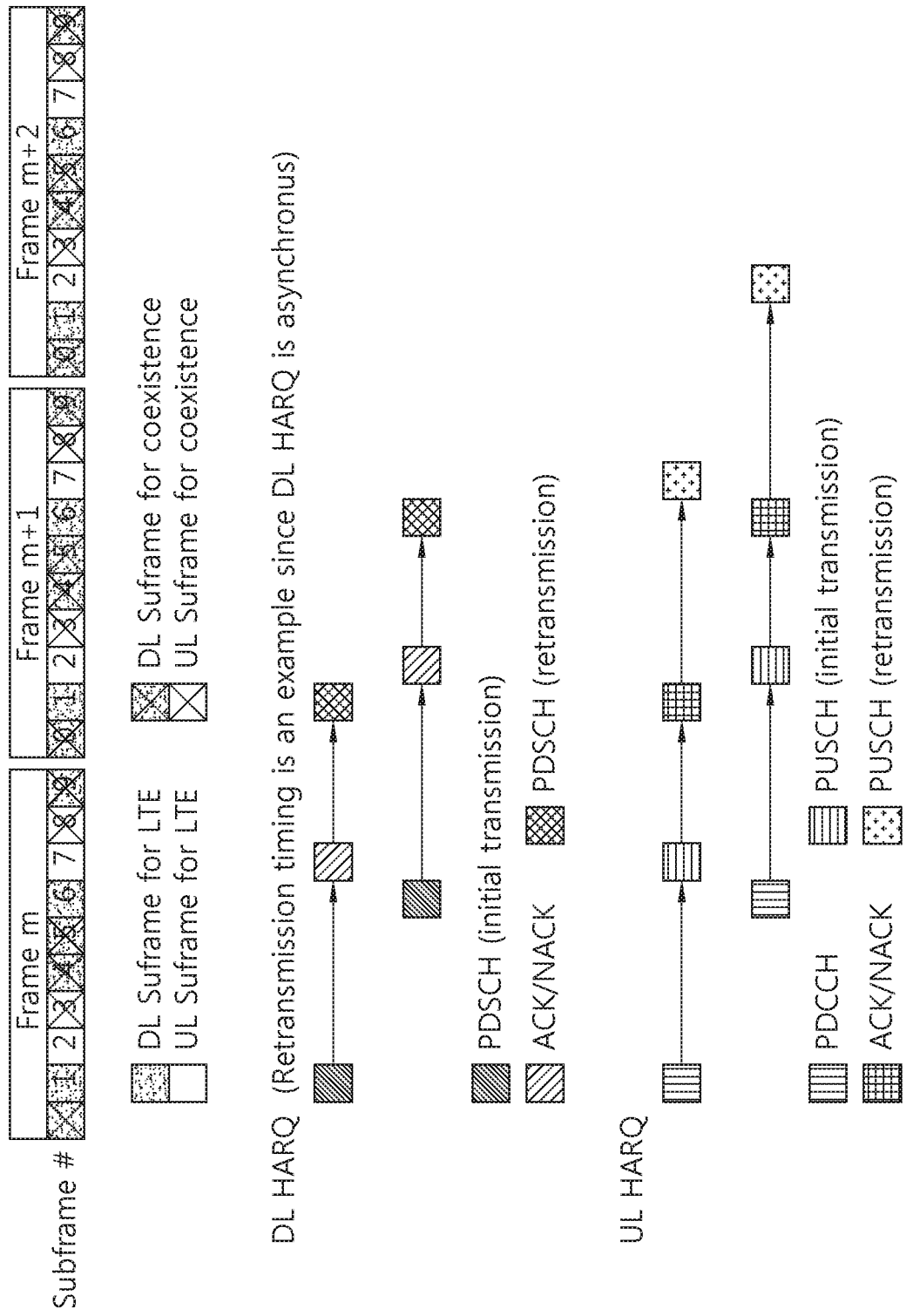
FIG. 12 is a diagram illustrating yet another example of alleviating the in-device coexistence interference by using the TDM scheme according to exemplary embodiments of the present invention.

FIG. 12 is a diagram illustrating yet another example of alleviating the in-device coexistence interference by using the TDM scheme according to exemplary embodiments of the present invention.

Referring to FIG. 12, by the TDM scheme based on the HARQ, a retransmission signal is preferably protected when data is transmitted based on the HARQ. Herein, being protected represents that retransmission is achieved without fail. If retransmission is not achieved in order to alleviate or avoid the in-device coexistence interference in the TDM scheme, the performance of the system will remarkably deteriorate. Based on this point, a transmission pattern is determined by considering a retransmission period. For DL transmission, subframes 1 and 6 are reserved in advance and for UL transmission, subframes 2 and 7 are reserved. These are called scheduled subframes. Unscheduled subframes for alleviating the in-device coexistence interference are not used in transmission in order to protect the ISM band.

Even in a scheme based on the HARQ similarly as a scheme based on DRX, the subframes reserved for transmission may be prevented from being transmitted in order to transmit a primary signal in the ISM. On the contrary, even in the unscheduled subframes, primary messages such as random access, system information, and a paging signal may be permitted to be transmitted.

The pattern may be given as a bitmap pattern. That is, the number of subframes indicated by one bit may be one or more. The period of the pattern is "the total length of the bitmap*the number of subframes per bit", and each bit may be "0" when a subframe directed by the bit is the scheduled subframe and each bit may be "1" when the corresponding subframe is the unscheduled subframe. On the contrary, when each subframe is the scheduled subframe, each bit may be "1" and when each subframe is the unscheduled subframe, each bit may be "0".

For example, it is assumed that the period is "20", a pattern expressing the subframe is "1001001000", the unscheduled subframe is "0", and the number of the subframes indicated by one bit is two. In the pattern representing the subframe, since first, fourth, and seventh bits are "1", subframes 0, 1, 6, 7, 12, and 13 are the scheduled subframes every period.

Figure 13:
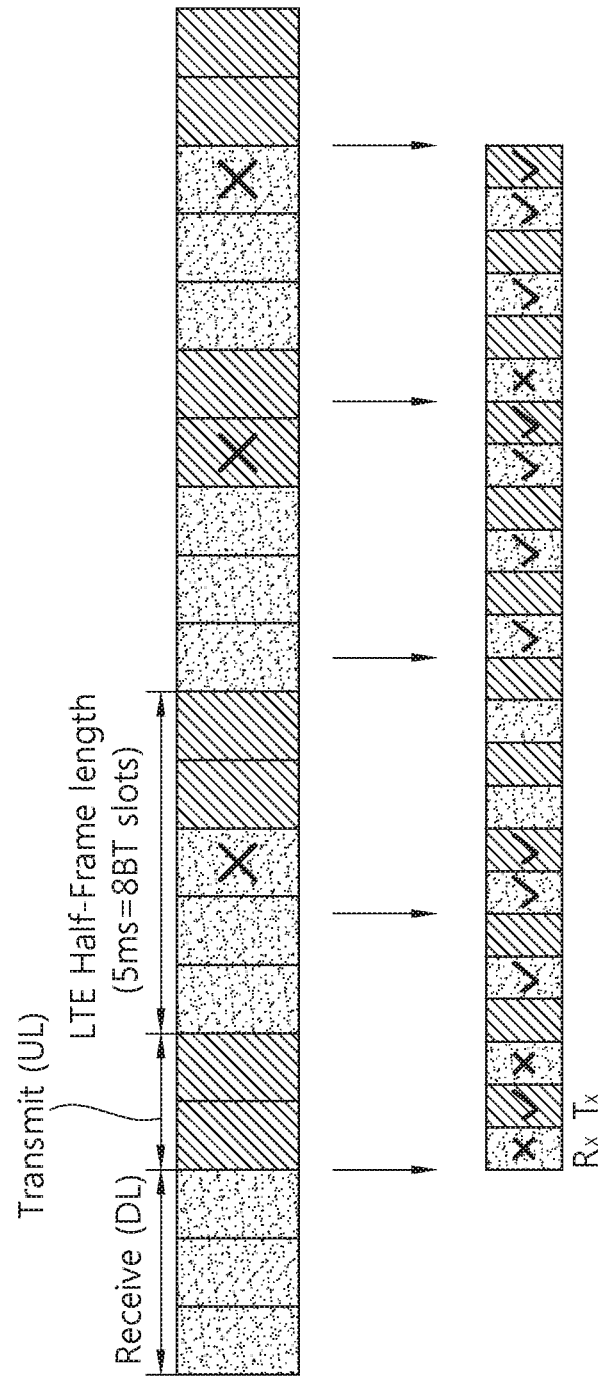
FIG. 13 is a diagram illustrating yet another example of alleviating the in-device coexistence interference according to exemplary embodiments of the present invention.

FIG. 13 is a diagram illustrating yet another example of alleviating the in-device coexistence interference according to exemplary embodiments of the present invention.

Referring to FIG. 13, by an autonomously denial scheme, when the in-device coexistence interference occurs in the terminal, transmission of the LTE is denied in order to protect the reception of the ISM. Herein, a ticked part means that transmission or reception is approved and a part marked by "X" means that transmission or reception is denied. Even though UL transmission is granted from the base station, the terminal denies granting not to perform UL transmission in order to protect the reception of the ISM. Similarly, transmission of the ISM is denied in order to protect the reception of the LTE.

Hereinafter, a method for controlling in-device coexistence (IDC) interference will be described.

Figure 14A:
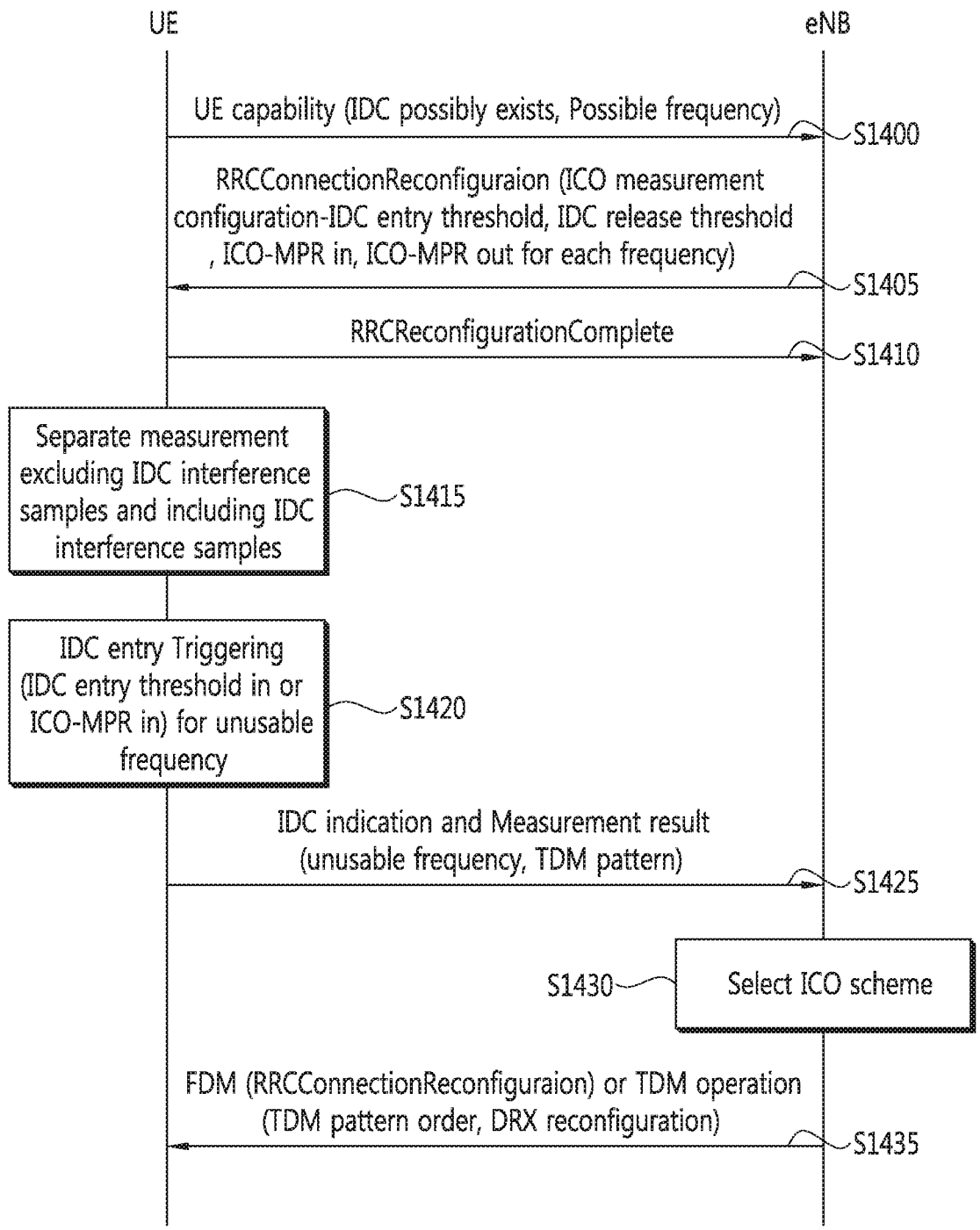
FIGS. 14A and 14B are a flow chart illustrating an example of operations of a User Equipment and a base station that perform in-device coexistence interference control
Figure 14B:
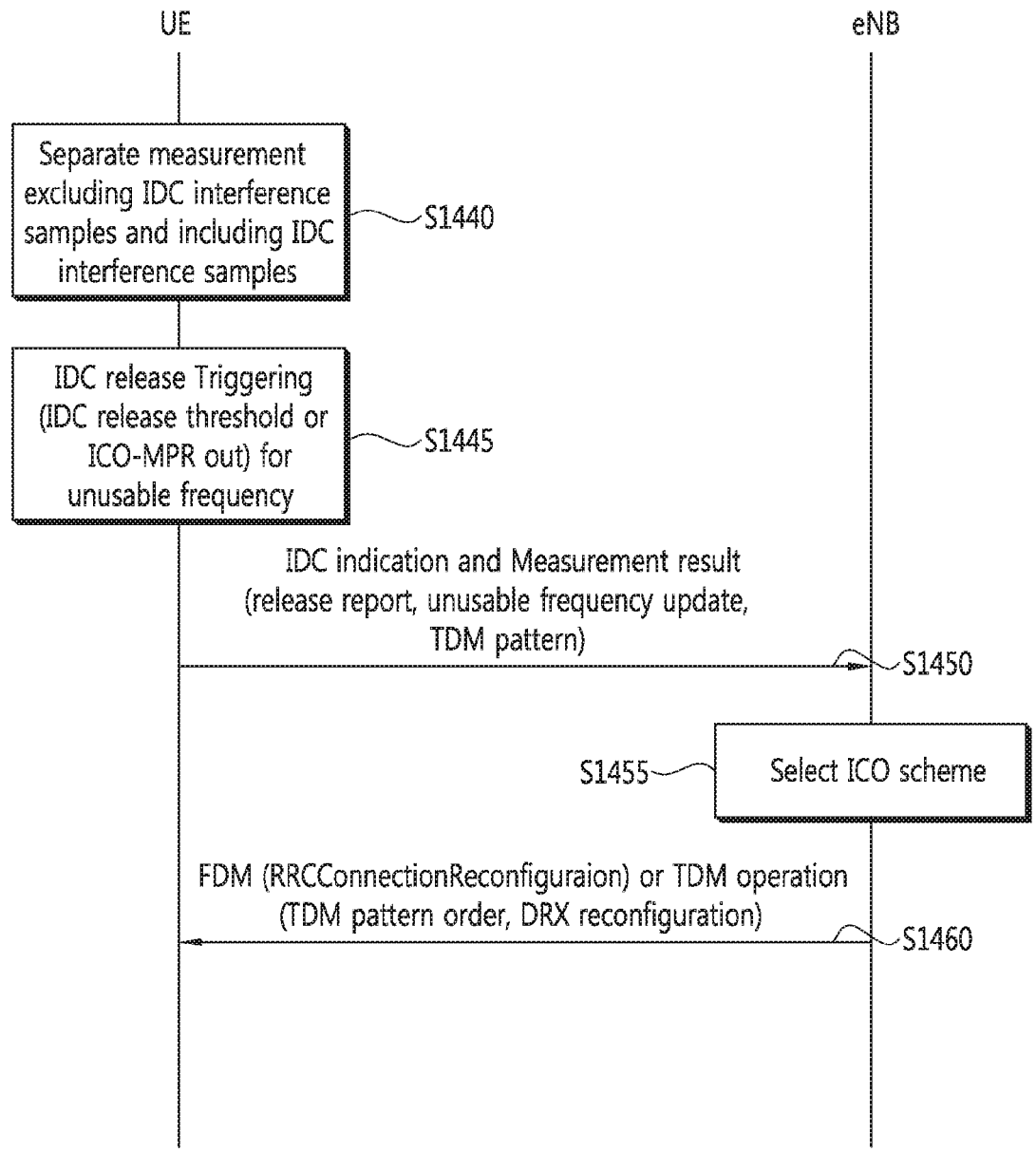

FIGS. 14A and 14B are a flow chart illustrating an example of operations of a User Equipment (UE) and a base station (BS) (or called as an eNB) that perform in-device coexistence interference control. It relates to an initial setting operation of a UE, which is related to an operation of transmitting UE capability information. Here, the operation is described by sequential steps and blocks, but exemplary embodiments of the present invention are not limited to the order of the steps, the steps are not exclusive but may include any other step(s), or one or more steps may be deleted in the flow chart.

Referring to FIG. 14A, a UE transmits UE capability information to the BS at step S1400.

The UE capability information may include information regarding whether or not there is possibility of IDC interference.

Also, the UE capability information may include information regarding a frequency band having possibility of presence of IDC interference. Also, the UE capability information may include information regarding a frequency band without possibility of the presence of IDC interference. Also, the UE capability information may include information regarding a frequency band which is determined not to have a possibility of the presence of IDC interference but having potential IDC interference.

Here, the frequency band having a possibility of the presence of IDC interference refers to a frequency band having a possibility of being an unusable frequency, and the unusable frequency refers to a frequency in a state in which communication is not easily performed due to ongoing IDC interference therein.

Table 2 below shows a scenario (or information) regarding whether or not IDC interference is ongoing.

TABLE 2

| Scenario | Definition |
| --- | --- |
| 1 | IDC interference is ongoing at serving frequency band |
| 2 | Potential IDC interference exists at serving frequency band (but it is not currently ongoing) |
| 3 | IDC interference is ongoing at certain frequency band, rather than at serving frequency band |
| 4 | Potential IDC interference exists at certain frequency band, rather than serving frequency band (but IDC interference is not currently ongoing) |

The respective scenarios indicate an interference state based on an interference type and a frequency band. Since an unusable frequency band is unrelated to whether or not it is a serving frequency band, all of the scenario 1 to scenario 3 may be considered to have ongoing IDC interference.

Figure 15:
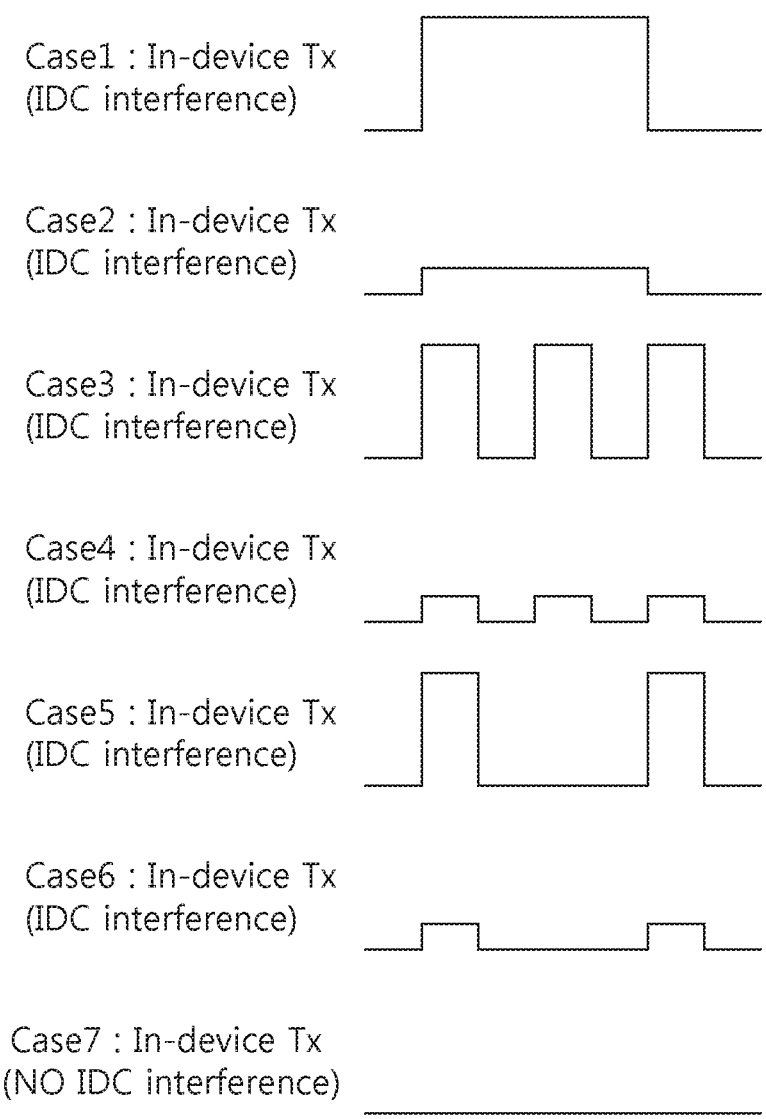
FIG. 15 illustrates cases that the UE receives an interference signal therein.

FIG. 15 illustrates cases that the UE receives an interference signal therein.

Referring to FIG. 15, receiving of an interference signal may be classified into seven cases based on interference oftenness and strength of power.

When the seven cases are classified into four patterns based on the oftenness of interference, case 1 and case 2 may be classified to have a continuous interference pattern, case 3 and case 4 may be classified to have bursty interference pattern, case 5 and case 6 may be classified into a sparse interference pattern, and case 7 may be classified into a none interference pattern.

When the seven cases are classified into three patterns based on strength of interference, case 1, case 3, and case 5 may be classified into a too strong interference pattern, case 2, case 4, and case 5 may be classified into an enough weak interference pattern, and case 7 may be classified into a none interference pattern.

Here, in an exemplary embodiment of the present invention, it is determined that IDC interference is ongoing in the UE, in the case corresponds to case 1 and case 3. Namely, the case corresponds to the case that interference is at least continuous or bursty and has very strong strength.

Meanwhile, a state in which coexistence interference occurs, although not an unusable frequency, having a possibility of being changed into a state in which IDC interference is ongoing, is called a "presence of potential IDC interference". For example, case 2, case 4, case 5, and case 6 may be determined to correspond to "presence of potential IDC interference". In another example, only case 5 having very strong strength may be determined to correspond to "presence of potential IDC interference".

Meanwhile, UE capability information transmitted in step S1400 may include IDC support indicator indicating whether the UE is allowed to send IDC indications. That is, UE capability information may include IDC support indicator indicating whether the UE is allowed to send IDC indications.

Also, the UE capability information may include a value recommended by the UE among threshold values (an entry threshold value (ICO-MPR_in) or a release threshold value (ICO-MPR_out)) used as references for determining whether or not IDC interference is ongoing. The threshold values may be set to be different for each UE based on characteristics of each UE. A threshold value recommended by each UE may be included in the UE capability information. The threshold values may be different for each frequency band or may be the same for every frequency band. A threshold value used as a reference for determining whether or not IDC interference is ongoing will be described in detail hereinafter.

Also, the UE capability information may include information indicating ISM performance of a UE. For example, one of ISM performance of a UE may be reducing a maximum transmission value of LTE uplink transmission to reduce interference toward ISM. The degree of reducing the maximum transmission value may vary according to ISM performance of a UE.

Meanwhile, in step S1400, the UE performance information transmitted by the UE may be included in a UE performance information message and transmitted, and here, the UE performance information message may include a physical layer parameters information entity or a measurement parameters information entity. The physical layer parameters information entity may include information indicating whether or not IDC-related operating is possible. It indicates whether or not controlling of IDC interference is supported.

Also, the measurement parameters information entity may include frequency band information. Here, the measurement parameters information entity may be configured in the form of a list of frequency bands having a possibility of IDC interference. Frequency band information included in the measurement parameters information entity may include threshold values (an entry threshold value (ICO-MPR_in) or a release threshold value (ICO-MPR_out)) used as references for determining whether or not IDC interference is ongoing.

The threshold values (an entry threshold value (ICO-MPR_in) or a release threshold value (ICO-MPR_out)) used as references for determining whether or not IDC interference is ongoing may exist in each frequency band of the list of frequency bands having a possibility of IDC interference. Also, the threshold values (an entry threshold value (ICO-MPR_in) or a release threshold value (ICO-MPR_out)) used as references for determining whether or not IDC interference is ongoing may be applied equally to all the frequency bands of the list of frequency bands having a possibility of IDC interference.

After the step S1400, the BS transmits IDC control measurement configuration information (i.e., IDC interference avoidance measurement configuration, which may be referred to as an "ICO measurement configuration information") including a condition for triggering an operation of controlling IDC interference at step S1405. That is, the BS may configure by dedicated signaling whether the UE is allowed to send an IDC indication. The ICO measurement configuration information may be included in an RRC connection reconfiguration message and transmitted.

For example, the BS may transmit the RRC connection reconfiguration message including information about the IDC capability of the BS (which may be referred to as "IDC enabling information") to the UE. The IDC enabling information is the information which allows the UE to transmit IDC indication to the BS. The IDC enabling information may be one bit information.

The ICO measurement configuration information may include IDC interference entry threshold value information. The UE compares a measurement result which has considered IDC interference and a measurement result which has not considered IDC interference, and when the measurement result which has considered IDC interference is greater than the measurement result which has not considered IDC interference by more than the IDC entry threshold value, the UE may determine that IDC interference is ongoing in a corresponding frequency. When IDC interference is ongoing, the corresponding frequency may be transferred in the field of an unusable frequency. Namely, ICO measurement configuration information may include information for configuring an IDC indication operation.

Also, the ICO measurement configuration information may include IDC interference release threshold information. In the situation that IDC interference is ongoing, when a difference value between the measurement result which has considered IDC interference and the measurement result which has not considered the IDC interference with respect to a frequency band having a difficulty in being used due to IDC interference is lowered to below the IDC interference release threshold value, the UE may determine that the frequency band, which was determined to have a difficulty in being used due to IDC interference, is usable again. The IDC release threshold value may be set to be identical to the IDC interference entry threshold value.

The IDC interference threshold values may be values related to measurement values of LTE downlink, which may be a triggering condition with respect to an interference direction from ISM to LTE.

The ICO measurement configuration information may include ICO-MPR (ICO-related Maximum Power Reduction). The ICO-MPR is a value used to lower a maximum transmission power value in an LTE uplink in order to reduce interference toward ISM in the LTE. An LTE uplink maximum transmission power value may be reduced by a corresponding value. Like P-MPR, final maximum transmission power may be applied by the greatest numerical value among comparison values of MPR, A-MPR, P-MPR, and ICO-MPR so as to be reduced. ICO-MPR determines an entry/release (in/out) of IDC interference. ICO-MPR means ICO-MPR_in, ICO-MPR_out or both.

For example, one (or only one) of IDC interference threshold values (the IDC interference entry threshold value or the IDC interference release threshold value or ICO-MPRs (ICO-MPR_in and ICO-MPR_out)) may be set to be used as a condition for performing triggering. Alternatively, both of IDC interference threshold values (the IDC interference entry threshold value and the IDC interference release threshold value or ICO-MPRs (ICO-MPR_in and ICO-MPR_out)) may be set to be used as a condition for performing triggering, so it may be configured such that when either of them operates, IDC indication is triggered.

The IDC interference threshold values (the IDC interference entry threshold value or the IDC interference release threshold value) or ICO-MPRs (ICO-MPR_in and ICO-MPR_out)) may be different in each frequency band or may be the same in every frequency band.

Here, the forgoing types of information may be included as one of ReportConfigEUTRA information elements in the following form within an RRC message and transmitted. The below elements refer to another event trigger configuration. The elements each may include version information.

TABLE 3

| eventIdc | SEQUENCE { | |
|---|---|---|
| | IdcEntryThr | INTEGER (−30..30), |
| | IdcResvThr | INTEGER (−30..30), |
| | IdcMprInThr | INTEGER (−30..30), |
| | RecIdcMprOutThr | INTEGER (−30..30), |
| } | | |

After the step S1400, the UE transmits an RRC reconfiguration complete message to the BS at step S1410. The RRC reconfiguration complete message may include acknowledgement with respect to the RRC connection reconfiguration message.

The UE performs a measurement in consideration of IDC interference and a measurement without consideration of IDC interference at step S1415. The measurements may be performed by using respective measurement samples by differentiating a part affected by IDC interference and a part not affected by IDC interference. Namely, a measurement sample affected by IDC interference and a measurement sample not affected by IDC interference are discriminately used.

First, a measurement rule for obtaining a measurement sample by the UE will be described. The rule for obtaining a measurement sample by the UE is also called a UE internal coordination.

Figure 16:
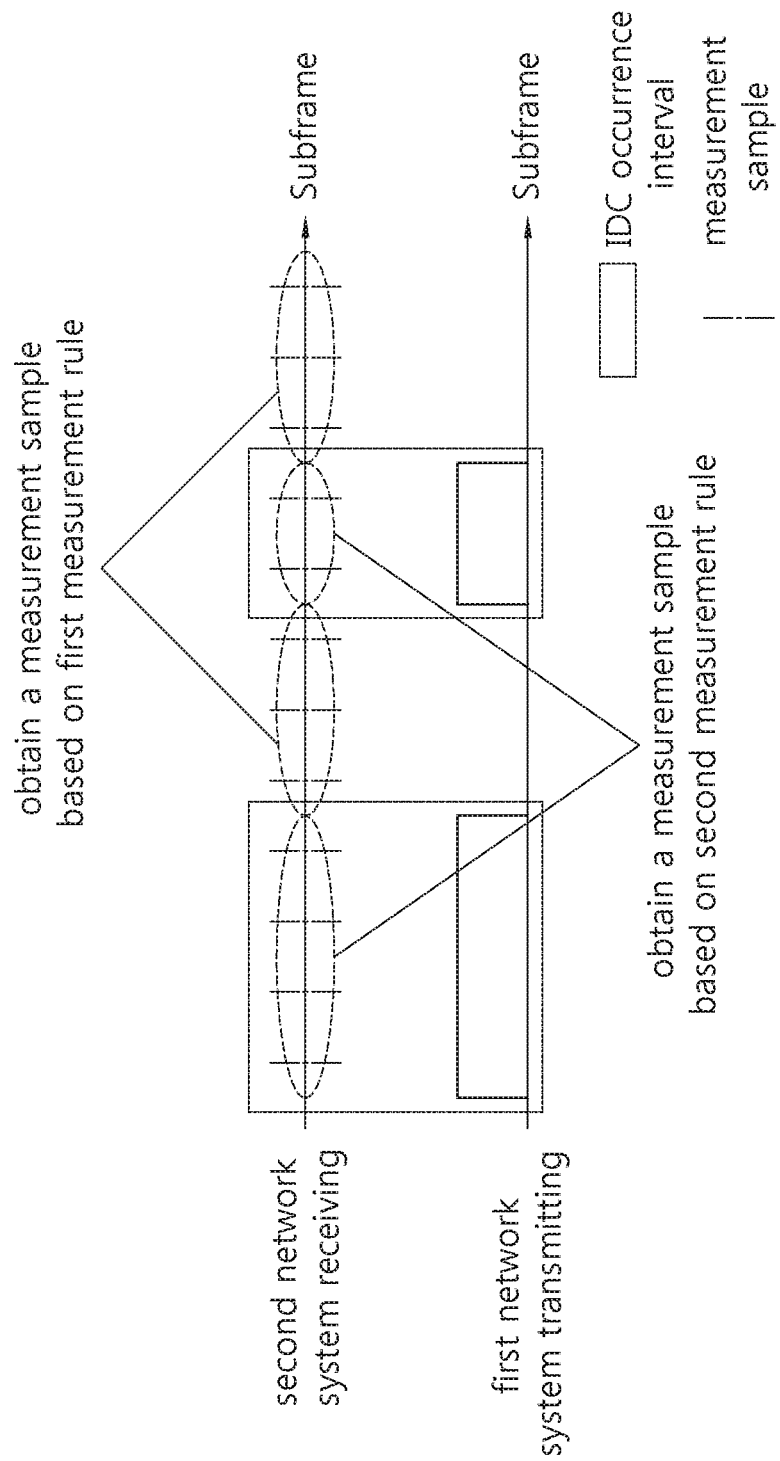
FIG. 16 is a view illustrating a measurement rule for obtaining a measurement sample in an interference-vulnerable band applied to an exemplary embodiment of the present invention.

FIG. 16 is a view illustrating a measurement rule for obtaining a measurement sample in an interference-vulnerable band applied to an exemplary embodiment of the present invention.

Referring to FIG. 16, a UE may obtain a measurement sample based on a first measurement rule. For example, the UE does not obtain a measurement sample in a section in which IDC interference occurs (referred to as an "interference interval", hereinafter) but obtains a measurement sample with respect to a second network system in a section in which IDC interference does not occur (referred to as a "non-interference interval", hereinafter). Here, the UE may obtain a measurement sample in each subframe, a predetermined subframe, or a certain subframe within the non-interference interval. Here, the second network system refers to a network system attacked by interference when IDC interference occurs. For example, when an ISM reception end is interfered by an LTE uplink, the ISM is a second network system. Conversely, when a reception end of LTE downlink is interfered by an ISM transmission end, the LTE system may be a second network system. Also, when IDC interference occurs, a network system providing an influence of interference is called a first network system.

Alternatively, the UE may obtain a measurement sample based on a second measurement rule. For example, the UE obtains a measurement sample with respect to a second network system in the non-interference interval like the first measurement rule, and obtains a measurement sample without IDC interference removed by an interference canceling technique (or denial technique) in the interference interval. Thus, the measurement sample in the non-interference interval will be purely a measurement value with respect to the second network system. A specific interference canceling technique is an implementation issue of a UE. In order to implement a second measurement rule, any interference canceling technique may be used.

When a measurement report is performed based on a measurement sample based on the first or second measurement rule, the UE may inform the BS about a pure channel value of the second network system in the interference-vulnerable band. Here, "the interference-vulnerable band" may be a band in which IDC interference is ongoing or a band in which potential IDC interference is ongoing.

When a measurement sample is obtained based on Reference Signal Received Quality (RSRQ) or Reference Signal Received Power (RSRP), a measurement sample according to the first and second measurement rules is expressed by Equation 1 shown below.

$$\text{Measurement Sample} = \frac{S}{I+N} \quad \text{[Equation 1]}$$

Here, "S" is strength of a reception signal in the second network system, "I" is strength of an interference signal (which is not IDC interference) acting in the second network system, and "N" is strength of noise. Namely, it refers to a relative ratio with respect to interference and noise of a reception signal. A specific implementation will follow a process of obtaining a corresponding concept of a wireless system.

When a measurement sample is obtained based on the RSRP, a measurement sample according to the first and second rules may be conceptually expressed by Equation 2 shown below.

$$\text{Measurement Sample} = S \quad \text{[Equation 2]}$$

Here, "S" is strength of a reception signal in the second network system. Namely, it indicates strength of a reception signal in a corresponding cell of the second network system. A specific implementation will follow a process of obtaining a corresponding concept of a wireless system.

Figure 17:
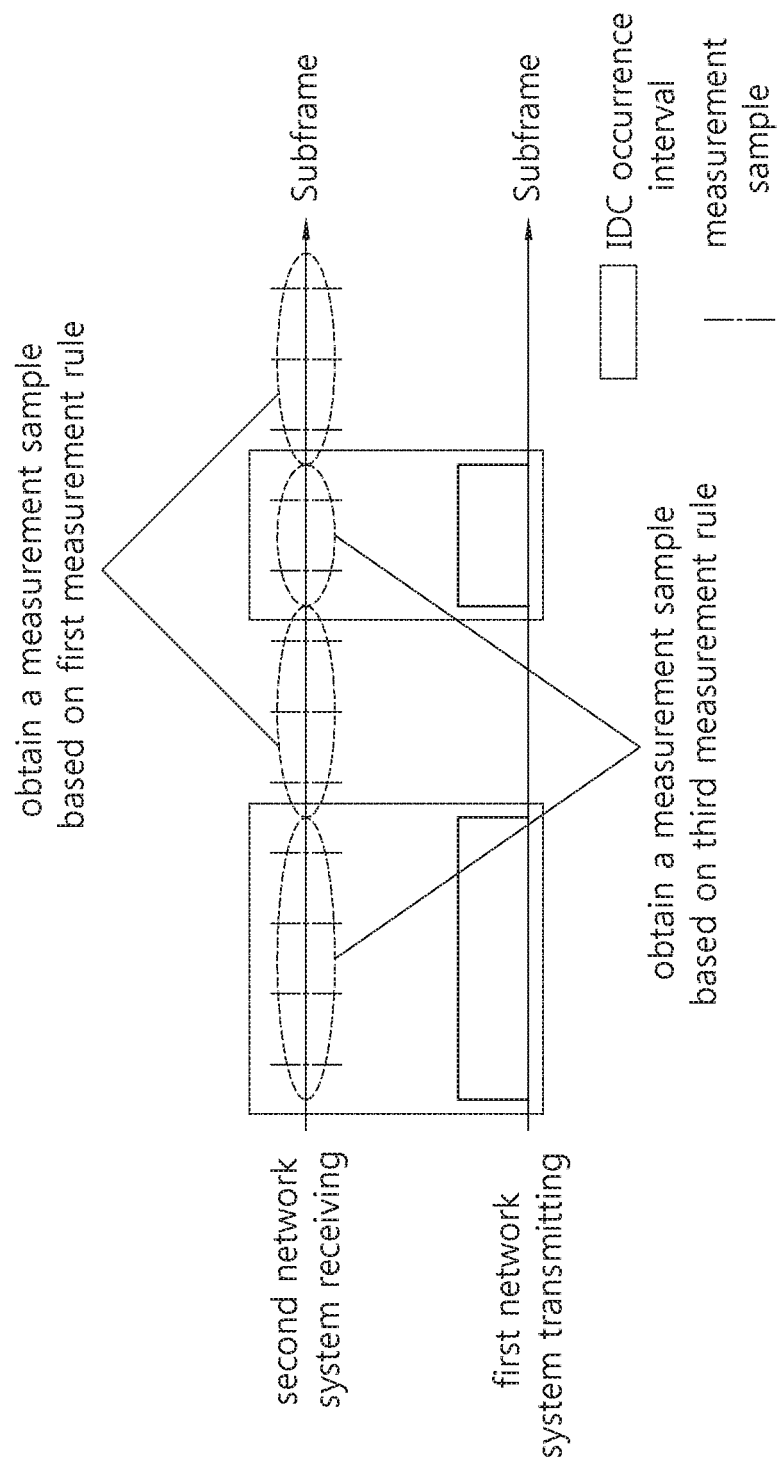
FIG. 17 is a view illustrating a measurement rule for obtaining a measurement sample in an interference-vulnerable band according to another exemplary embodiment of the present invention.

FIG. 17 is a view illustrating a measurement rule for obtaining a measurement sample in an interference-vulnerable band according to another exemplary embodiment of the present invention.

Referring to FIG. 17, a UE obtains a measurement sample based on the first measurement rule in the non-interference interval, but obtains a measurement sample based on a third measurement rule in the interference interval.

According to the third measurement rule, the UE may obtain two types of measurement samples in the same subframe. For example, the UE obtains a first measurement sample with respect to an IDC interference signal itself by the first network system and obtains a second measurement sample with respect to a signal of the second network system, respectively. Namely, the UE obtains the first measurement sample by using an interference canceling technique that extracts only a signal of the first network system from the interference interval, and obtains the second measurement sample by using the interference canceling technique that extracts only a signal of the second network system. Accordingly, the UE may report a measurement to the BS with the two measurement values based on the two independent measurement samples.

In another example, the UE obtains a first measurement sample that reflects an IDC interference signal and obtains a second measurement sample with respect to a signal of the second network system from which interference has been canceled. In this case, the first measurement sample may be conceptually expressed by Equation 3 shown below, and the second measurement sample may be conceptually expressed by Equation 1 shown above.

$$1st \text{ Measurement Sample} = \frac{S}{I+N+I'} \quad \text{[Equation 3]}$$

Here, I' is strength of IDC interference. Namely, the UE may obtain the first measurement sample without the interference canceling technique from the interference interval, and obtain the second measurement sample by using an interference canceling technique that extracts only a signal of the second network system. In this case, no restriction is applied to the measurement sample.

In another example the first measurement sample may be expressed by Equation 4 shown below.

$$1st \text{ Measurement Sample} = I' \quad \text{[Equation 4]}$$

Here, I' is strength of IDC interference. Namely, the UE may measure only strength of interference by a first network in the interference interval to obtain a first measurement sample, and obtain a second measurement sample by using an interference canceling technique that extracts only a signal of the second network system. Only the first measurement sample may be obtained in the interference interval by the third rule according to UE capability. Namely, there may be a case in which two samples are not simultaneously obtained in the interference interval.

A method of obtaining two types of measurement values used in reporting a measurement with the measurement samples obtained in FIG. 17.

In an embodiment, one measurement value is obtained through filtering with the second measurement samples obtained according to the third rule and the measurement samples obtained according to the first rule. Another measurement value is obtained through filtering with the first measurement samples obtained according to the third rule and the measurement samples obtained according to the first rule.

In another embodiment, one measurement value is obtained through filtering only with measurement samples obtained according to the first rule within the samples obtained according to the third rule. Namely, one measurement value is obtained through filtering only with measurement samples in the non-interference interval. Another measurement value is obtained with only the first measurement samples obtained according to the third rule. Namely another measurement value is obtained through filtering with only the first measurement samples in the interference interval.

Such a third measurement rule may be applicable to a TDM-based interference adjustment, as well as to an FDM-based interference adjustment.

According to the third measurement rule, a measurement report may include measurement rule information. The measurement rule information may indicate that the measurement report includes a measurement value in consideration of IDC interference. For example, the measurement rule information indicates that the measurement value has been obtained based on a measurement sample in consideration of the IDC interference. In this case, the measurement report includes a pure measurement sample with respect to the second network is system not including IDC interference and a measurement sample including IDC interference.

Meanwhile, the measurement report may not include measurement rule information. In this case, when a measurement report with respect to an interference-vulnerable band is received, the BS implicitly recognizes that the measurement report includes a measurement value which has considered IDC interference.

Meanwhile, an entity (e.g., a UE) that performs the measurement may be a single entity. Alternatively, a plurality of entities may perform measurement. For example, an entity performing a measurement in consideration of IDC interference and an entity performing a measurement without consideration of IDC interference may exist independently.

Based on the measurements, the UE may determine whether IDC interference is ongoing in the UE, and then the UE may report the IDC indication and the at least one result of the measurements to the BS, following to IDC triggering which is described below.

Referring back to FIG. 14A, after the step S1415, the UE triggers an event indicating that IDC interference (which may be referred to as "IDC entry triggering") has started to be ongoing with respect to an available frequency band at step S1420. Here, an IDC interference entry threshold value or "ICO-MPR_in" may be used. Namely, the UE compares the measurement result which has considered IDC interference and the measurement results which has not considered IDC interference, and when the measurement result which has considered IDC interference is greater than the measurement results which has not considered IDC interference by more than the IDC interference entry threshold value, the UE triggers an event indicating that a state in which IDC interference is ongoing at a corresponding frequency has started. Or, when ICO-MPR is greater than ICO-MPR_in, the UE may trigger an event indicating that a state in which IDC interference is ongoing has started.

Here, the triggering may be performed only on a serving cell or may be performed on both of the serving cell and a neighbor cell. Here, triggering on both of the serving cell and the neighbor cell refers to triggering an event indicating that a state in which IDC interference is ongoing has started when any one of the serving cell and the neighbor cell satisfies a corresponding triggering condition.

In another example, the UE may perform triggering by using only a measurement sample not affected by IDC interference. Here, the triggering is performed for mobility. Namely, since a triggering condition for mobility is met, triggering of an operation of controlling IDC interference may be performed.

The UE reports a measurement result a result of the corresponding event triggering and an IDC indication to the BS at step S1425. The IDC indicator also may be referred to as "IDC indicator". Or, the IDC indication may be transmitted as IDC indicator which may one bit or two bit bitmap information.

The IDC indication (or IDC indicator) may include IDC entry indicator which indicates whether the UE is in IDC entry situation. Or, the IDC indicator may be the IDC entry indicator.

The IDC entry indicator may be one bit bitmap or two bits bitmap. For example, when the IDC entry indicator is '1', the IDC entry indicator indicates IDC entry situation, and when the IDC entry indicator is '0', the IDC entry indicator indicates IDC release situation.

That is, the IDC indication indicates whether the UE is in IDC entry situation or whether the UE is in IDC release situation. Or, the IDC indication indicates whether the UE is in IDC entry situation or whether the UE is in IDC release situation with 1 or 2 bit IDC indicator.

The IDC indication (or IDC indicator) may include an unusable frequency due to IDC interference and information regarding a Time Division Multiplex (TDM) pattern available in the corresponding frequency.

The unusable frequency band information may include information regarding a range of a frequency band.

Alternatively, the unusable frequency band information may include a frequency band indicator used in an LTE band. For example, the unusable frequency band information may include information regarding "band 7", "band 38", or "band 40". The UE may indicate an unusable frequency band through the frequency band indicator.

Alternatively, the unusable frequency band information may include an absolute frequency indicator (e.g., E-UTRA Absolute Radio Frequency Channel Number (EARFCN)) used in an LTE band. The UE may indicate an unusable frequency band through the absolute frequency indicator.

Alternatively, the unusable frequency band information may include a cell index. The UE may indicate that a cell-related frequency indicated by the cell index is an unusable frequency band.

The IDC indication (or IDC indicator) includes at least one of an entry parameter (e.g., IDC Entry Threshold), a resolve parameter (e.g., IDC Resolve Threshold), an MPR_in parameter (e.g., ICO MPR_in Threshold), or an MPR_out parameter (e.g., ICO MPR_out threshold). The entry parameter indicates a case that IDC interference has occurred in excess of an entry threshold value, the resolve parameter indicates a case that IDC interference has been resolved below a resolve threshold value, the MPR_in parameter indicates a case that IDC interference has occurred in excess of an ICO-MPR_in value, and the MPR_out parameter indicates a case that IDC interference has been resolved below an ICO-MPR_out value, respectively. The IDC indication (or IDC indicator) may indicate what type of triggering the UE triggering is by using each parameter.

The measurement result may include only the measurement result with respect to a part not affected by IDC interference.

Alternatively, the measurement result may include the measurement result with respect to the part not affected by IDC interference and a measurement result with respect to a part affected by the IDC interference.

Alternatively, the measurement result may include the measurement result with respect to the part not affected by IDC interference and a difference value between the measurement result with respect to the part not affected by IDC interference and the measurement result with respect to the part affected by the IDC interference.

Also, the measurement result may include a novel component within a MeasResults information element. For example, it may be "measResultIdc" or measResultIdc with version information.

After the step S1425, the BS selects the most appropriate IDC interference control method (which may be referred to as "ICO scheme") based on the measurement result and the IDC indication (or IDC indicator) at step S1430, and transfers an IDC interference control operation to the UE at step S1435. The corresponding control operation is transferred from the BS to the UE and the transferred operation is performed between the BS and the UE. Here, the IDC control operation may be an FDM operation or a TDM operation. The FDM operation may be performed through RRC connection reconfiguration. The TDM operation may be performed by indicating a TDM pattern or through discontinuous reception (DRX) reconfiguration. Also, the FDM operation or the TDM operation may be an operation according to the FIGS. 5 to 13.

Here, in case that a problem arises in a frequency band providing a service, if a usable frequency does not cause a problem by load balancing and it is determined that there is not much influence on handover according to the measurement result (e.g., when an RSRP or RSRQ value of the corresponding frequency band is sufficiently great), an FDM operation is performed, or otherwise, a TDM operation is performed in a serving cell.

Referring to FIG. 14B, after performing the IDC interference control operation, the UE performs a measurement which has considered IDC interference and a measurement which has not considered IDC interference, respectively at step S1440. The measurement may be performed by discriminating a part affected by IDC interference and a part not affected by IDC interference.

Also, the UE triggers that IDC interference has terminated with respect to the unusable frequency band (which may be referred to as "IDC release triggering") at step S1445. Here, the termination of the IDC interference refers to a state in which IDC interference is sufficiently small or very rarely occurs in the corresponding frequency band, so there is not difficulty in performing communication. Here, the IDC interference resolve threshold value or ICO-MPR_out value may be used. Namely, in the situation that IDC interference is ongoing, when the difference between the measurement result which has considered the IDC interference and the measurement result which has not considered the IDC interference with respect to a frequency that can be hardly used due to IDC interference is lowered to below the IDC resolve threshold value, the event indicating that the frequency band which was determined to be hardly used due to IDC interference is used again may be triggered. Or, when the ICO-MPR value is reduced to be smaller than ICO-MPR_out, an event indicating that the state in which the IDC interference was ongoing was resolved in the corresponding frequency band may be triggered.

Here, triggering may be performed only on a serving cell or may be performed on both of the serving cell and a neighbor cell.

After the step S1445, the UE reports the measurement result and the IDC indication to the BS at step S1450. The IDC indicator also may be referred to as an IDC indicator.

The IDC indication may include indicator which indicates whether the UE is in IDC release situation. Or, the IDC indication may be the IDC release indicator.

The IDC release indicator may be one bit bitmap or two bits bitmap. At this time, the IDC release indicator may have XOR relationship with the IDC entry indicator. For example, when the IDC release indicator is '1', the IDC release indicator indicates IDC release situation, and when the IDC release indicator is '0', the IDC release indicator indicates that the UE is still in IDC entry situation.

The IDC indication (or IDC indicator) may include unusable frequency band information and information regarding a TDM pattern available in a corresponding frequency. Here, the unusable frequency band information may be information which has been updated according to the IDC interference control operation performed in a previous step. Also, the measurement result may further include a release report.

When IDC interference controlling is required, the BS selects the most appropriate IDC interference control method based on the measurement result and the IDC indication (or IDC indicator) at step S1455, and the BS transfers an IDC interference control operation to the UE at step S1460. Here, the IDC interference control operation may be an FDM operation or a TDM operation. The FDM operation may be performed through RRC connection reconfiguration. The TDM operation may be performed by indicating a TDM pattern or through DRX reconfiguration. Here, in case that a problem arises in a frequency band providing a service, if a usable frequency does not cause a problem by load balancing and it is determined that there is not much influence on handover according to the measurement result (e.g., when an RSRP or RSRQ value of the corresponding frequency band is sufficiently great), an FDM operation is performed, or otherwise, a TDM operation is performed in a serving cell.

Figure 18A:
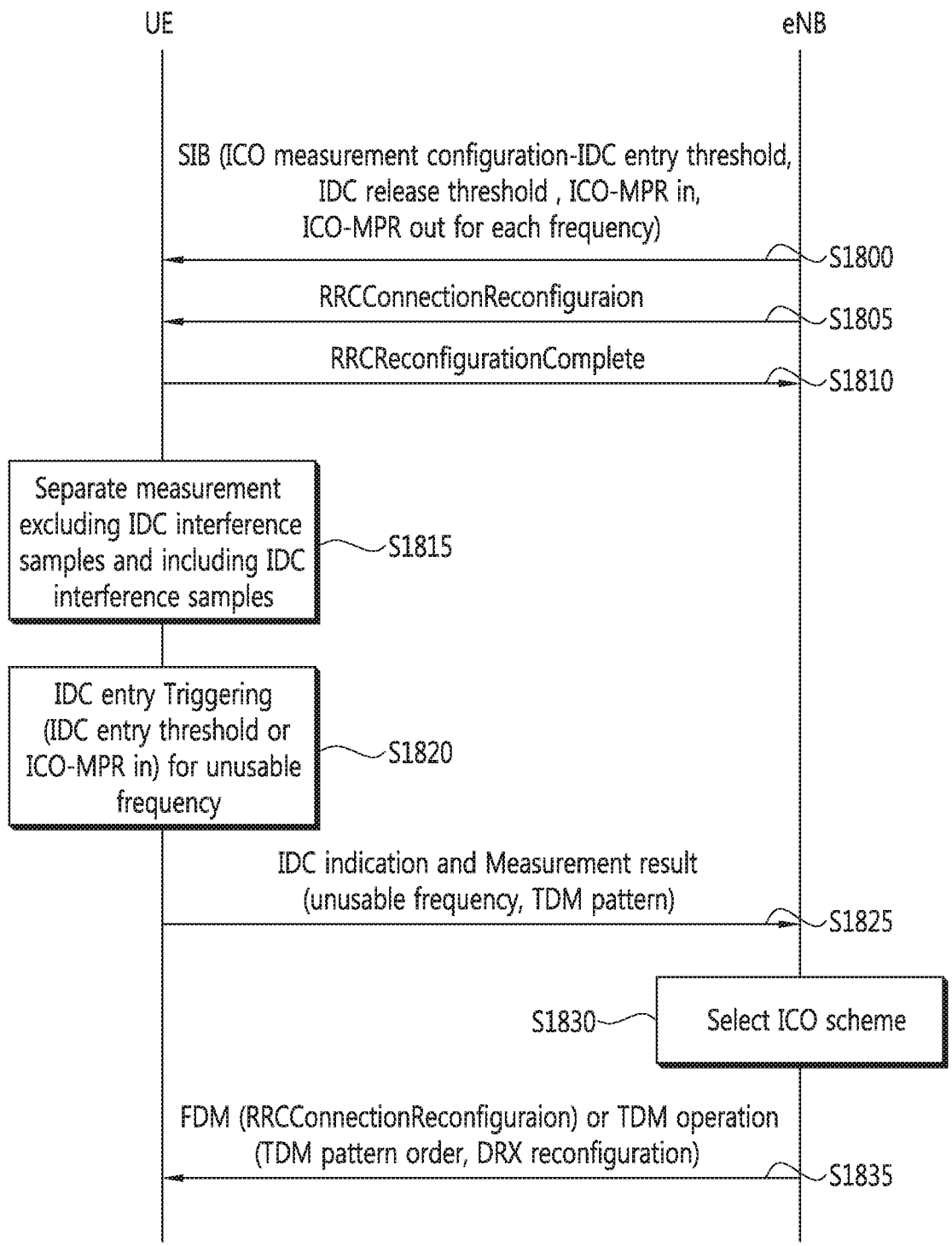

FIGS. 18A and 18B are flow charts illustrating another example of operations of the UE and the BS that perform IDC interference control. It is an initial setting operation of the UE, which is related to an operation of transmitting system information by the BS. Here, the operation is described by sequential steps and blocks, but exemplary embodiments of the present invention are not limited to the order of the steps, the steps are not exclusive but may include any other step(s), or one of more steps may be deleted in the flow chart.

Referring to FIG. 18A, the BS transmits a system information block (SIB) to the UE at step S1800. Here, the SIB transmitted by the BS may include IDC interference control measurement configuration information (which may be referred to as "ICO measurement configuration information"). The ICO measurement configuration information may include an IDC control triggering condition. Specifically, the ICO measurement configuration information may include IDC interference entry threshold value information indicating that IDC is ongoing in a corresponding frequency and IDC interference release threshold value information indicating that a frequency band having a difficulty in being used due to IDC interference is available to be used again. The IDC interference release threshold value may be set to be identical to the IDC interference entry threshold value. The IDC interference threshold values, which are values related to LTE downlink measurement values, may be a triggering condition with respect to an interference direction from ISM to LTE.

Also, the ICO measurement configuration information may further include ICO-MPR for determining IN/OUT of IDC interference. ICO-MPR may include ICO-MPR_in and ICO-MPR_out.

Here, either the IDC interference threshold value (the entry threshold value or the release parameter value) or the ICO-MPR (ICO-MPR_in or ICO-MPR_out) may be set to be used as triggering condition. Alternatively, both of the IDC interference threshold value (the entry threshold value or the release parameter value) or the ICO-MPR (ICO-MPR_in or ICO-MPR_out) may be set to be used as a triggering condition, so that an operation of any one of them may bring about triggering.

After the step S1800 the BS transmits an RRC connection reconfiguration message to the UE at step S1805, and in response, the UE transmits an RRC reconfiguration complete message to the BS at step S1810. The RRC reconfiguration complete message may include acknowledgement with respect to the RRC connection reconfiguration message.

The UE performs a measurement in consideration of IDC interference and a measurement without consideration of IDC interference at step S1815. The measurements may be performed by using respective measurement samples by differentiating a part affected by IDC interference and a part not affected by IDC interference. Namely, a measurement sample affected by IDC interference and a measurement sample not affected by IDC interference are discriminately used.

The UE triggers an event (e.g., IDC entry triggering) indicating that IDC interference has started to be ongoing with respect to an available frequency band at step S1820. Here, an IDC interference entry threshold value or ICO-MPR_in may be used. Namely, the UE compares the measurement result which has considered IDC interference and the measurement results which has not considered IDC interference, and when the measurement result which has considered IDC interference is greater than the measurement results which has not considered IDC interference by more than the IDC interference entry threshold value, the UE triggers an event indicating that a state in which IDC interference is ongoing at a corresponding frequency has started. Or, when ICO-MPR is greater than ICO-MPR_in, the UE may trigger an event indicating that a state in which IDC interference is ongoing has started.

Here, the triggering may be performed only on a serving cell or may be performed on both of the serving cell and a neighbor cell.

The UE reports a measurement result as a result of the corresponding event triggering and an IDC indication (or IDC indicator) to the BS at step S1825. The IDC indication (or IDC indicator) may include an unusable frequency due to IDC interference and information regarding a TDM pattern available in the corresponding frequency. The measurement result may include only the measurement result with respect to the part without affected by the IDC interference. Alternatively, the measurement result may include the measurement result with respect to the part affected by IDC interference and a measurement result with respect to a part affected by the IDC interference.

After the step S1825, the BS selects the most appropriate IDC interference control method (which may be referred to as "ICO scheme") based on the measurement result and the IDC interference generation indicator at step S1830.

The BS transfers an IDC interference control operation to the UE at step S1835. The corresponding control operation is transferred from the BS to the UE and the transferred operation is performed between the BS and the UE. Here, the IDC control operation may be an FDM operation or a TDM operation. The FDM operation may be performed through RRC connection reconfiguration. The TDM operation may be performed by indicating a TDM pattern or through DRX reconfiguration.

Here, in case that a problem arises in a frequency band providing a service, if a usable frequency does not cause a problem by load balancing and it is determined that there is not much influence on handover according to the measurement result (e.g., when an RSRP or RSRQ value of the corresponding frequency band is sufficiently great), an FDM operation is performed, or otherwise, a TDM operation is performed in a serving cell. Also, the FDM operation or the TDM operation may be an operation according to the FIGS. 5 to 13.

Referring to FIG. 18B, after performing the IDC interference control operation, the UE performs a measurement which has considered IDC interference and a measurement which has not considered IDC interference, respectively at step S1840. The measurement may be performed by discriminating a part affected by IDC interference and a part not affected by IDC interference.

Based on the measurements, the UE may determine whether IDC interference is ongoing in the UE, and then the UE may report the IDC indication and the at least one result of the measurements to the BS, following to IDC triggering which is described below.

After the step S1840, the UE triggers that IDC interference has terminated with respect to the unusable frequency band (which may be referred to as "IDC release triggering") at step S1845. Here, the termination of the IDC interference refers to a state in which IDC interference is sufficiently small or very rarely occurs in the corresponding frequency band, so there is not difficulty in performing communication. Here, the IDC interference resolve threshold value or ICO-MPR_out value may be used. Namely, in the situation that IDC interference is ongoing, when the difference between the measurement result which has considered the IDC interference and the measurement result which has not considered the IDC interference with respect to a frequency that can be hardly used due to IDC interference is lowered to below the IDC resolve threshold value, the event indicating that the frequency band which was determined to be hardly used due to IDC interference is used again may be triggered. Or, when the ICO-MPR value is reduced to be smaller than ICO-MPR_out, an event indicating that the state in which the IDC interference was ongoing was resolved in the corresponding frequency band may be triggered.

Triggering may be performed only on a serving cell or may be performed on both of the serving cell and a neighbor cell.

After the step S1845, the UE reports the measurement result and the IDC indication (or IDC indicator) to the BS at step S1850. The IDC indication (or IDC indicator) may include updated unusable frequency band information and/or information regarding a TDM pattern available in a corresponding frequency. Here, the updated unusable frequency band information may be information which has been updated according to the IDC interference control operation performed in a previous step. Also, the measurement result may further include a release report.

When IDC interference controlling is required, the BS selects the most appropriate IDC interference control method based on the measurement result and the IDC indication (or IDC indicator) at step S1855, and the BS transfers an IDC interference control operation to the UE at step S1860. Here, the IDC interference control operation may be an FDM operation or a TDM operation. The FDM operation may be performed through RRC connection reconfiguration. The TDM operation may be performed by indicating a TDM pattern or through DRX reconfiguration. Here, in case that a problem arises in a frequency band providing a service, if a usable frequency does not cause a problem by load balancing and it is determined that there is not much influence on handover according to the measurement result (e.g., when an RSRP or RSRQ value of the corresponding frequency band is sufficiently great), an FDM operation is performed, or otherwise, a TDM operation is performed in a serving cell.

Figure 19:
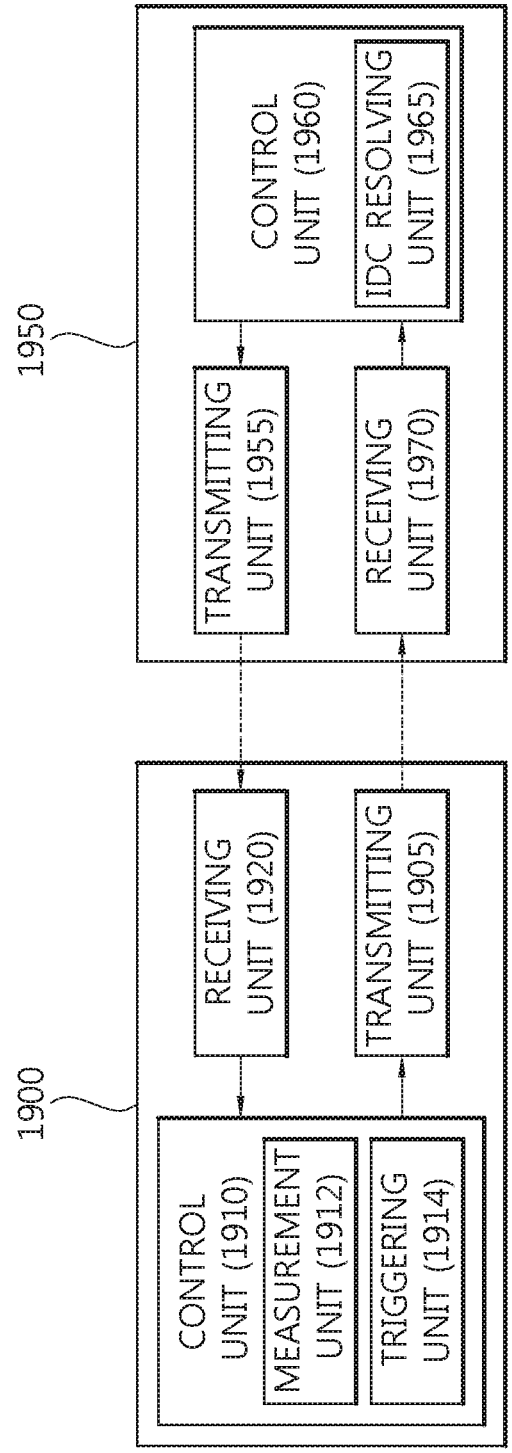
FIG. 19 is a block diagram illustrating an example of a User Equipment and a base station that perform in-device coexistence interference control.

FIG. 19 is a block diagram illustrating an example of a User Equipment (UE) and a base station (BS) that perform in-device coexistence interference control.

Referring to FIG. 19, a UE 1900 may include transmitting unit 1905, control unit 1910 or receiving unit 1920. The control unit 1910 may include triggering unit 1912 or measurement unit 1914.

Transmitting unit 1905 may transmit UE capability information to the BS 1950. The UE capability information may include information regarding whether or not there is possibility of IDC interference. Also, the UE capability information may include information regarding a frequency band having possibility of presence of IDC interference. Also, the UE capability information may include information regarding a frequency band without possibility of the presence of IDC interference. Also, the UE capability information may include information regarding a frequency band which is determined not to have a possibility of the presence of IDC interference but having potential IDC interference.

Meanwhile, UE capability information transmitted may include IDC support indicator indicating whether the UE 1900 is allowed to send IDC indications. That is, UE capability information may include IDC support indicator indicating whether the UE 1900 is allowed to send IDC indications.

Also, the UE capability information may include a value recommended by the UE 1900 among threshold values (an entry threshold value, a release threshold value, ICO-MPR_in, or ICO-MPR_out) used as references for determining whether or not IDC interference is ongoing.

Also, the UE capability information may include information indicating ISM performance of a UE 1900. For example, one of ISM performance of a UE 1900 may be reducing a maximum transmission value of LTE uplink transmission to reduce interference toward ISM. The degree of reducing the maximum transmission value may vary according to ISM performance of a UE 1900.

Meanwhile, the UE performance information transmitted by the UE 1900 may be included in a UE performance information message and transmitted, and here, the UE performance information message may include a physical layer parameters information entity or a measurement parameters information entity. The physical layer parameters information entity may include information indicating whether or not IDC-related operating is possible. It indicates whether or not controlling of IDC interference is supported.

The receiving unit 1920 receives IDC control measurement configuration information (i.e., IDC interference avoidance measurement configuration, which may be referred to as an "ICO measurement configuration information") including a condition for triggering an operation of controlling IDC interference. That is, the BS 1950 may configure by dedicated signaling whether the UE 1900 is allowed to send an IDC indication. The ICO measurement configuration information may be included in an RRC connection reconfiguration message and transmitted.

For example, the receiving unit 1920 may receive the RRC connection reconfiguration message including information about the IDC capability of the BS 1950 (which may be referred to as "IDC enabling information") from the BS 1950.

The ICO measurement configuration information may include IDC interference entry threshold value information. The control unit 1910 compares a measurement result which has considered IDC interference and a measurement result which has not considered IDC interference, and when the measurement result which has considered IDC interference is greater than the measurement result which has not considered IDC interference by more than the IDC entry threshold value, the control unit 1910 may determine that IDC interference is ongoing in a corresponding frequency.

When IDC interference is ongoing, the corresponding frequency may be transferred in the field of an unusable frequency. Namely, ICO measurement configuration information may include information for configuring an IDC indication operation.

Also, the ICO measurement configuration information may include IDC interference release threshold information. In the situation that IDC interference is ongoing, when a difference value between the measurement result which has considered IDC interference and the measurement result which has not considered the IDC interference with respect to a frequency band having a difficulty in being used due to IDC interference is lowered to below the IDC interference release threshold value, the control unit 1910 may determine that the frequency band, which was determined to have a difficulty in being used due to IDC interference, is usable again.

The transmitting unit 1905 may transmit an RRC reconfiguration complete message to the BS 1950. The RRC reconfiguration complete message may include acknowledgement with respect to the RRC connection reconfiguration message.

The measurement unit 1914 may perform a measurement in consideration of IDC interference and a measurement without consideration of IDC interference. The measurements may be performed by using respective measurement samples by differentiating a part affected by IDC interference and a part not affected by IDC interference. Namely, a measurement sample affected by IDC interference and a measurement sample not affected by IDC interference are discriminately used.

Based on the measurements, the control unit 1910 may determine whether IDC interference is ongoing in the UE 1900, and then the transmitting unit 1905 may report the IDC indication and the at least one result of the measurements to the BS, following to IDC triggering which is described below.

The triggering unit 1912 may trigger an event indicating that IDC interference (which may be referred to as "IDC entry triggering") has started to be ongoing with respect to an available frequency band. Namely, the triggering unit 1912 compares the measurement result which has considered IDC interference and the measurement results which has not considered IDC interference, and when the measurement result which has considered IDC interference is greater than the measurement results which has not considered IDC interference by more than the IDC interference entry threshold value, the triggering unit 1912 triggers an event indicating that a state in which IDC interference is ongoing at a corresponding frequency has started.

Here, the triggering may be performed only on a serving cell or may be performed on both of the serving cell and a neighbor cell.

In another example, the UE 1900 may perform triggering by using only a measurement sample not affected by IDC interference.

The transmitting unit 1905 may report a measurement result a result of the corresponding event triggering and an IDC indication (or IDC indicator) to the BS 1950.

The IDC indication (or IDC indicator) may include IDC entry indicator which indicates whether the UE 1900 is in IDC entry situation. Or, the IDC indication (or IDC indicator) may be the IDC entry indicator.

The IDC entry indicator may be one bit bitmap or two bits bitmap. For example, when the IDC entry indicator is '1', the IDC entry indicator indicates IDC entry situation, and when the IDC entry indicator is '0', the IDC entry indicator indicates IDC release situation.

That is, the IDC indication indicates whether the UE is in IDC entry situation or whether the UE is in IDC release situation. Or, the IDC indication indicates whether the UE is in IDC entry situation or whether the UE is in IDC release situation with 1 or 2 bit IDC indicator.

The IDC indication (or IDC indicator) may include an unusable frequency due to IDC interference and information regarding a TDM pattern available in the corresponding frequency.

The unusable frequency band information may include information regarding a range of a frequency band.

Alternatively, the unusable frequency band information may include a frequency band indicator used in an LTE band.

Alternatively, the unusable frequency band information may include a cell index.

The measurement result may include only the measurement result with respect to a part not affected by IDC interference.

Alternatively, the measurement result may include the measurement result with respect to the part not affected by IDC interference and a measurement result with respect to a part affected by the IDC interference.

Alternatively, the measurement result may include the measurement result with respect to the part not affected by IDC interference and a difference value between the measurement result with respect to the part not affected by IDC interference and the measurement result with respect to the part affected by the IDC interference.

Also, the measurement result may include a novel component within a MeasResults information element.

When the BS 1950 selects the most appropriate IDC interference control method (which may be referred to as "ICO scheme") based on the measurement result and the IDC indication (or IDC indicator), the receiving unit 1920 may receive an IDC interference control operation from the BS 1950.

Here, the IDC control operation may be an FDM operation or a TDM operation. The FDM operation may be performed through RRC connection reconfiguration. The TDM operation may be performed by indicating a TDM pattern or through DRX reconfiguration.

After receiving the IDC interference control operation, the measurement unit 1914 may perform a measurement which has considered IDC interference and a measurement which has not considered IDC interference, respectively. The measurement unit 1914 may perform measurements by discriminating a part affected by IDC interference and a part not affected by IDC interference.

Also, the triggering unit 1912 may trigger that IDC interference has terminated with respect to the unusable frequency band (which may be referred to as "IDC release triggering"). Here, triggering may be performed only on a serving cell or may be performed on both of the serving cell and a neighbor cell.

The transmitting unit 1905 may report the measurement result and the IDC indication (or IDC indicator) to the BS 1950. The IDC indication (or IDC indicator) indicator may include IDC release indicator which indicates whether the UE 1900 is in IDC release situation. Or, the IDC indication (or IDC indicator) may be the IDC release indicator. The IDC release indicator may be one bit bitmap or two bits bitmap. At this time, the IDC release indicator may have XOR relationship with the IDC entry indicator. For example, when the IDC release indicator is '1', the IDC release indicator indicates IDC release situation, and when the IDC release indicator is '0', the IDC release indicator indicates that the UE 1900 is still in IDC entry situation.

That is, the IDC indication indicates whether the UE is in IDC entry situation or whether the UE is in IDC release situation. Or, the IDC indication indicates whether the UE is in IDC entry situation or whether the UE is in IDC release situation with 1 or 2 bit IDC indicator.

The IDC indication (or IDC indicator) may include unusable frequency band information and information regarding a TDM pattern available in a corresponding frequency. Here, the unusable frequency band information may be information which has been updated according to the IDC interference control operation performed in a previous step. Also, the measurement result may further include a release report.

When IDC interference controlling is required, the receiving unit 1920 may further receive selected appropriate IDC interference control method based on the measurement result and the IDC indication (or IDC indicator). Here, the IDC interference control operation may be an FDM operation or a TDM operation.

Meanwhile, a BS 1950 may include transmitting unit 1955, control unit 1960 or receiving unit 1970. The control unit 1960 may include IDC resolving unit 1965.

The receiving unit 1970 may receive UE capability information from the UE 1900. The UE capability information may include information regarding whether or not there is possibility of IDC interference. Also, the UE capability information may include information regarding a frequency band having possibility of presence of IDC interference. Also, the UE capability information may include information regarding a frequency band without possibility of the presence of IDC interference. Also, the UE capability information may include information regarding a frequency band which is determined not to have a possibility of the presence of IDC interference but having potential IDC interference.

Meanwhile, UE capability information transmitted may include IDC support indicator indicating whether the UE 1900 is allowed to send IDC indications. That is, UE capability information may include IDC support indicator indicating whether the UE 1900 is allowed to send IDC indications.

For example, the UE capability information may include a value recommended by the UE 1900 among threshold values (an entry threshold value, a release threshold value, ICO-MPR_in, or ICO-MPR_out) used as references for determining whether or not IDC interference is ongoing.

Also, the UE capability information may include information indicating ISM performance of a UE 1900. For example, one of ISM performance of a UE 1900 may be reducing a maximum transmission value of LTE uplink transmission to reduce interference toward ISM. The degree of reducing the maximum transmission value may vary according to ISM performance of a UE 1900.

Meanwhile, the UE performance information transmitted by the UE 1900 may be included in a UE performance information message and transmitted, and here, the UE performance information message may include a physical layer parameters information entity or a measurement parameters information entity. The physical layer parameters information entity may include information indicating whether or not IDC-related operating is possible. It indicates whether or not controlling of IDC interference is supported.

The transmitting unit 1955 may transmit IDC control measurement configuration information (i.e., IDC interference avoidance measurement configuration, which may be referred to as an "ICO measurement configuration information") including a condition for triggering an operation of controlling IDC interference to the UE 1900. The ICO measurement configuration information may be included in an RRC connection reconfiguration message and transmitted.

For example, the transmitting unit 1955 may transmit the RRC connection reconfiguration message including information about the IDC capability of the BS 1950 (which may be referred to as "IDC enabling information") to the UE 1900.

The ICO measurement configuration information may include IDC interference entry threshold value information. The UE 1900 compares a measurement result which has considered IDC interference and a measurement result which has not considered IDC interference, and when the measurement result which has considered IDC interference is greater than the measurement result which has not considered IDC interference by more than the IDC entry threshold value, the UE 1900 may determine that IDC interference is ongoing in a corresponding frequency.

When IDC interference is ongoing, the corresponding frequency may be transferred in the field of an unusable frequency. Namely, ICO measurement configuration information may include information for configuring an IDC indication operation.

Also, the ICO measurement configuration information may include IDC interference release threshold information. In the situation that IDC interference is ongoing, when a difference value between the measurement result which has considered IDC interference and the measurement result which has not considered the IDC interference with respect to a frequency band having a difficulty in being used due to IDC interference is lowered to below the IDC interference release threshold value, the UE 1900 may determine that the frequency band, which was determined to have a difficulty in being used due to IDC interference, is usable again.

The receiving unit 1970 may receive an RRC reconfiguration complete message from the UE 1900. The RRC reconfiguration complete message may include acknowledgement with respect to the RRC connection reconfiguration message.

The receiving unit 1970 may receive a measurement result which the UE 1900 performs measurement and an IDC indication (or IDC indicator) from the UE 1900.

The IDC indication (or IDC indicator) may include IDC entry indicator which indicates whether the UE 1900 is in IDC entry situation. Or, the IDC indication (or IDC indicator) may be the IDC entry indicator.

The IDC entry indicator may be one bit bitmap or two bits bitmap. For example, when the IDC entry indicator is '1', the IDC entry indicator indicates IDC entry situation, and when the IDC entry indicator is '0', the IDC entry indicator indicates IDC release situation.

That is, the IDC indication indicates whether the UE is in IDC entry situation or whether the UE is in IDC release situation. Or, the IDC indication indicates whether the UE is in IDC entry situation or whether the UE is in IDC release situation with 1 or 2 bit IDC indicator.

The IDC indication (or IDC indicator) may include an unusable frequency due to IDC interference and information regarding a TDM pattern available in the corresponding frequency.

The unusable frequency band information may include information regarding a range of a frequency band.

Alternatively, the unusable frequency band information may include a frequency band indicator used in an LTE band.

Alternatively, the unusable frequency band information may include a cell index.

The measurement result may include only the measurement result with respect to a part not affected by IDC interference.

Alternatively, the measurement result may include the measurement result with respect to the part not affected by IDC interference and a measurement result with respect to a part affected by the IDC interference.

Alternatively, the measurement result may include the measurement result with respect to the part not affected by IDC interference and a difference value between the measurement result with respect to the part not affected by IDC interference and the measurement result with respect to the part affected by the IDC interference.

Also, the measurement result may include a novel component within a MeasResults information element.

The IDC resolving unit 1965 selects the most appropriate IDC interference control method (which may be referred to as "ICO scheme") based on the measurement result and the IDC indication (or IDC indicator). Here, the IDC control operation may be an FDM operation or a TDM operation.

The transmitting unit 1955 may transmit an IDC interference control operation to the UE 1900.

The FDM operation may be performed through RRC connection reconfiguration. The TDM operation may be performed by indicating a TDM pattern or through DRX reconfiguration.

The receiving unit 1970 may receive the measurement result which is measured again by the UE 1900 and the IDC indication (or IDC indicator) from the UE 1900.

The IDC indication (or IDC indicator) may include IDC release indicator which indicates whether the UE 1900 is in IDC release situation. Or, the IDC indication (or IDC indicator) may be the IDC release indicator. The IDC release indicator may be one bit bitmap or two bits bitmap. At this time, the IDC release indicator may have XOR relationship with the IDC entry indicator. For example, when the IDC release indicator is '1', the IDC release indicator indicates IDC release situation, and when the IDC release indicator is '0', the IDC release indicator indicates that the UE 1900 is still in IDC entry situation.

The IDC indication (or IDC indicator) may include unusable frequency band information and information regarding a TDM pattern available in a corresponding frequency. Here, the unusable frequency band information may be information which has been updated according to the IDC interference control operation performed in a previous step. Also, the measurement result may further include a release report.

The IDC resolving unit 1965 selects the most appropriate IDC interference control method based on the measurement result and the IDC indication (or IDC indicator) if needed. Here, the IDC control operation may be an FDM operation or a TDM operation.

In said example system, methods is described based on flow charts by sequential steps and blocks, but exemplary embodiments of the present invention are not limited to the order of the steps, the steps are not exclusive but may include any other step(s), or one of more steps may be deleted in the flow chart.

While exemplary embodiments of the present invention have been shown and described in connection with the embodiments, it will be apparent to those skilled in the art that modifications and variations can be made without departing from the spirit and scope of the is invention as defined by the appended claims.

What is claimed is:

1. A method for avoiding an interference, comprising:
   receiving, by a User Equipment (UE), In Device Coexistence (IDC) enabling information that indicates whether the UE is configured to initiate an IDC indication to a Base Station (BS) through a Radio Resource Control (RRC) connection reconfiguration message;
   generating, by the UE, the IDC indication; and
   transmitting, to the BS, the IDC indication including updated unusable frequency information and Time Division Multiplex (TDM) pattern information based on discontinuous reception (DRX) information and indicating an update on whether the UE is in an IDC entry situation or whether the UE is in an IDC release situation with a 1 or 2 bit IDC indicator,
   wherein a pattern periodicity interval comprises a scheduled period interval and an unscheduled period interval to avoid the IDC interference based on the DRX.

2. The method of claim 1, further comprising:
transmitting, to the BS, at least one of a measurement in consideration of IDC and a measurement without consideration of IDC.

3. The method of claim 1, wherein the updated unusable frequency information includes information of an updated frequency associated with an IDC interference.

4. The method of claim 1,
wherein the IDC entry situation is determined based on a comparison of a measurement result which has considered IDC interference and a measurement result which has not considered IDC interference, and
wherein when the comparison is greater than a threshold, an event indicating that a state in which IDC interference is ongoing is triggered.

5. The method of claim 1, further comprising:
determining whether IDC is ongoing in the UE; and
receiving an IDC control from the BS.

6. The method of claim 1, wherein capability information of the UE is a one bit bitmap indicator indicating the UE supports IDC.

7. The method of claim 1, wherein the updated unusable frequency information corresponds to information regarding an unusable frequency in which IDC is ongoing, and the TDM pattern information corresponds to information regarding an applicable Time Division Multiplex pattern.

8. A method for controlling an interference, comprising:
generating, by a Base Station (BS), IDC enabling information associated with a User Equipment (UE);
transmitting, from the BS to the UE, the IDC enabling information that indicates whether the UE is configured to initiate an IDC indication to BS through a Radio Resource Control (RRC) connection reconfiguration message; and
receiving the IDC indication from the UE, the IDC indication including updated unusable frequency information and Time Division Multiplex (TDM) pattern information based on discontinuous reception (DRX) information and indicating an update on whether the UE is in an IDC entry situation or whether the UE is in an IDC release situation with a 1 or 2 bit IDC indicator,
wherein a pattern periodicity interval comprises a scheduled period interval and an unscheduled period interval to avoid the IDC interference based on the DRX.

9. The method of claim 8, further comprising:
receiving, by the BS, at least one of a measurement in consideration of IDC and a measurement without consideration of IDC from the UE.

10. The method of claim 8, wherein the IDC entry situation is determined based on a comparison of a measurement result which has considered IDC interference and a measurement result which has not considered IDC interference, and
wherein when the comparison is greater than a threshold, an event indicating that a state in which IDC interference is ongoing is triggered.

11. A User Equipment (UE) for avoiding an interference in a wireless communication system, the UE comprising:
a receiver to receive, from a Base Station (BS), IDC enabling information that indicates whether the UE is allowed to send an IDC indication;
a processor to generate the IDC indication; and
a transmitter to transmit the IDC indication including updated unusable frequency information and Time Division Multiplex (TDM) pattern information based on discontinuous reception (DRX) information and indicating an update on whether the UE is in an IDC entry situation or whether the UE is in an IDC release situation with a 1 or 2 bit IDC indicator,
wherein a pattern periodicity interval comprises a scheduled period interval and an unscheduled period interval to avoid the IDC interference based on the DRX.

12. The UE of claim 11, wherein the transmitter transmits at least one of a measurement in consideration of IDC and a measurement without consideration of IDC to the BS.

13. The UE of claim 11, wherein the updated unusable frequency information includes information of an updated frequency associated with an IDC interference.

14. The UE of claim 11, wherein the IDC entry situation is determined based on a comparison of a measurement result which has considered IDC interference and a measurement result which has not considered IDC interference, and
wherein when the comparison is greater than a threshold, an event indicating that a state in which IDC interference is ongoing is triggered.

15. The UE of claim 12, further comprising:
a controller to determine whether IDC is ongoing in the UE,
wherein the receiver receives an IDC control from the BS.

16. The UE of claim 11, wherein capability information of the UE is a one bit bitmap indicator indicating the UE supports IDC.

17. The UE of claim 11, wherein the updated unusable frequency information corresponds to information regarding an unusable frequency in which IDC is ongoing, and the TDM pattern information corresponds to information regarding an applicable Time Division Multiplex pattern.

* * * * *